(12) United States Patent
Hermoni et al.

(10) Patent No.: US 11,044,146 B2
(45) Date of Patent: Jun. 22, 2021

(54) SYSTEM, METHOD, AND COMPUTER PROGRAM FOR AUTOMATICALLY GENERATING TRAINING DATA FOR ANALYZING A NEW CONFIGURATION OF A COMMUNICATION NETWORK

(71) Applicant: Amdocs Development Limited, Limassol (CY)

(72) Inventors: Ofer Hermoni, Tenafly, NJ (US); Nimrod Sandlerman, Ramat Gan (IL); Eyal Felstaine, Herzliya (IL)

(73) Assignee: AMDOCS DEVELOPMENT LIMITED, Limassol (CY)

(*) Notice: Subject to any disclaimer, the term of this patent is extended or adjusted under 35 U.S.C. 154(b) by 26 days.

(21) Appl. No.: 16/280,279

(22) Filed: Feb. 20, 2019

(65) Prior Publication Data
US 2019/0280918 A1     Sep. 12, 2019

Related U.S. Application Data

(60) Provisional application No. 62/660,142, filed on Apr. 19, 2018, provisional application No. 62/648,287, (Continued)

(51) Int. Cl.
*H04L 12/24*    (2006.01)
*H04L 12/26*    (2006.01)
(Continued)

(52) U.S. Cl.
CPC .......... *H04L 41/0803* (2013.01); *G06F 9/505* (2013.01); *G06F 11/0787* (2013.01); *G06F 11/3006* (2013.01); *G06F 11/3051* (2013.01);
*G06F 16/1734* (2019.01); *G06K 9/6256* (2013.01); *G06N 20/00* (2019.01); *H04L 41/06* (2013.01); *H04L 41/0604* (2013.01); *H04L 41/069* (2013.01); *H04L 41/0609* (2013.01); *H04L 41/0622* (2013.01); *H04L 41/0695* (2013.01); *H04L 41/08* (2013.01);
(Continued)

(58) Field of Classification Search
CPC .................. H04L 41/0859; H04L 41/0803
See application file for complete search history.

(56) References Cited

U.S. PATENT DOCUMENTS

2017/0004423 A1*  1/2017  DeLuisi .............. G06Q 10/067
2017/0019302 A1   1/2017  Lapiotis et al.
(Continued)

OTHER PUBLICATIONS

Hermoni et al., U.S. Appl, No. 16/280,513, filed Feb. 20, 2019.
(Continued)

*Primary Examiner* — El Hadji M Sall
(74) *Attorney, Agent, or Firm* — Zilka-Kotab, P.C.

(57) ABSTRACT

A system, method, and computer program product are provided for training an AI-based network management system, in accordance with one embodiment. In use, log data and first network configuration data are received for a first configuration of a communication network. Additionally, second network configuration data is received for a second configuration of the communication network. Further, simulated log data is produced for the second configuration of the communication network, based on the log data and the second network configuration data.

14 Claims, 17 Drawing Sheets

Related U.S. Application Data filed on Mar. 26, 2018, provisional application No. 62/648,281, filed on Mar. 26, 2018, provisional application No. 62/642,524, filed on Mar. 13, 2018, provisional application No. 62/639,910, filed on Mar. 7, 2018, provisional application No. 62/639,923, filed on Mar. 7, 2018, provisional application No. 62/639,913, filed on Mar. 7, 2018.

(51) Int. Cl.

| | |
|---|---|
| *G06N 20/00* | (2019.01) |
| *G06F 16/17* | (2019.01) |
| *G06F 9/50* | (2006.01) |
| *G06F 11/07* | (2006.01) |
| *G06F 11/30* | (2006.01) |
| *G06K 9/62* | (2006.01) |
| *H04L 12/911* | (2013.01) |
| *G06N 3/02* | (2006.01) |

(52) U.S. Cl.
CPC ...... *H04L 41/0813* (2013.01); *H04L 41/0816* (2013.01); *H04L 41/0823* (2013.01); *H04L 41/0859* (2013.01); *H04L 41/0866* (2013.01); *H04L 41/12* (2013.01); *H04L 41/142* (2013.01); *H04L 41/147* (2013.01); *H04L 41/16* (2013.01); *H04L 41/5009* (2013.01); *H04L 43/06* (2013.01); *H04L 43/062* (2013.01); *H04L 43/067* (2013.01); *H04L 43/0876* (2013.01); *H04L 43/16* (2013.01); *H04L 47/788* (2013.01); *G06N 3/02* (2013.01); *H04L 41/5032* (2013.01); *H04L 41/5064* (2013.01)

(56) References Cited

U.S. PATENT DOCUMENTS

| | | | |
|---|---|---|---|
| 2017/0034705 A1* | 2/2017 | Stocker | H04W 12/04 |
| 2017/0201548 A1 | 7/2017 | Kinder et al. | |
| 2018/0239830 A1* | 8/2018 | Dialani | G06K 9/6263 |

OTHER PUBLICATIONS

International Search Report and Written Opinion from PCT Application No. PCT/IB2019/052404, dated Jul. 12, 2019.
Hermoni et al., U.S. Appl. No. 16/280,245, filed Feb. 20, 2019.
Hermoni et al., U.S. Appl. No. 16/280,259, filed Feb. 20, 2019.
Hermoni et al., U.S. Appl. No. 16/280,265, filed Feb. 20, 2019.
Hermoni et al., U.S. Appl. No. 16/280,272, filed Feb. 20, 2019.
Hermoni et al., U.S. Appl. No. 16/280,286, filed Feb. 20, 2019.
Hermoni et al., U.S. Appl. No. 16/280,301, filed Feb. 20, 2019.
Hermoni et al., U.S. Appl. No. 16/280,310, filed Feb. 20, 2019.
Hermoni et al., U.S. Appl. No. 16/280,312, filed Feb. 20, 2019.
Hermoni et al., U.S. Appl. No. 16/280,320, filed Feb. 20, 2019.
Hermoni et al., U.S. Appl. No. 16/280,353, filed Feb. 20, 2019.
Hermoni et al., U.S. Appl. No. 16/280,367, filed Feb. 20, 2019.
Hermoni et al., U.S. Appl. No. 16/280,246, filed Feb. 20, 2019.
Hermoni et al., U.S. Appl. No. 16/280,260, filed Feb. 20, 2019.
Hermoni et al., U.S. Appl. No. 16/280,386, filed Feb. 20, 2019.
Hermoni et al., U.S. Appl. No. 16/280,634, filed Feb. 20, 2019.

* cited by examiner

SYSTEM, METHOD, AND COMPUTER PROGRAM FOR AUTOMATICALLY GENERATING TRAINING DATA FOR ANALYZING A NEW CONFIGURATION OF A COMMUNICATION NETWORK

RELATED APPLICATIONS

The present application claims priority to: U.S. Provisional Application No. 62/639,910, entitled "SYSTEM, METHOD, AND COMPUTER PROGRAM FOR IMPLEMENTING PRUNING RULES IN AN ARTIFICIAL INTELLIGENCE (AI) BASED NETWORK MANAGEMENT SYSTEM," filed on Mar. 7, 2018; U.S. Provisional Application No. 62/639,913, entitled "SYSTEM, METHOD, AND COMPUTER PROGRAM FOR DAMPING A FEEDBACK LOAD-CHANGE IN A COMMUNICATION NETWORK MANAGED BY AN AUTOMATIC NETWORK MANAGEMENT SYSTEM," filed on Mar. 7, 2018; U.S. Provisional Application No. 62/639,923, entitled "SYSTEM, METHOD, AND COMPUTER PROGRAM FOR IMPLEMENTING A MARKETPLACE FOR ARTIFICIAL INTELLIGENCE (AI) BASED MANAGED NETWORK SERVICES," filed on Mar. 7, 2018; U.S. Provisional Application No. 62/642,524, entitled "A METHOD AND A SYSTEM FOR MITIGATING AN ATTACK ON A NETWORK BY EFFECTING FALSE ALARMS," filed on Mar. 13, 2018; U.S. Provisional Application No. 62/648,281, entitled "SYSTEM, METHOD, AND COMPUTER PROGRAM FOR AUTOMATICALLY GENERATING TRAINING DATA FOR ANALYZING A NEW CONFIGURATION OF A COMMUNICATION NETWORK," filed on Mar. 26, 2018; U.S. Provisional Application No. 62/648,287, entitled "SYSTEM, METHOD, AND COMPUTER PROGRAM FOR IMPLEMENTING A MARKETPLACE FOR EDGE COMPUTING," filed on Mar. 26, 2018; and U.S. Provisional Application No. 62/660,142, entitled "SYSTEM, METHOD, AND COMPUTER PROGRAM FOR MITIGATING FALSIFIED LOG DATA PROVIDED TO AN AI-LEARNING SYSTEM MANAGING A COMMUNICATION NETWORK," filed on Apr. 19, 2018, the entire contents of each of the listed applications which are incorporated herein by reference.

FIELD OF THE INVENTION

The present invention relates to automatic generation of simulated log data of a simulated communication network, and more particularly to a training-emulation system generating artificial log data for a particular planned network configuration and/or topology.

BACKGROUND

In the context of a communication network managed by an AI-based network management and/or orchestration system using rules, in a generalized approach, the AI-based network management system includes an AI-rule-generation engine that generates rules, which are used by an AI-analysis engine to manage the communication network. The AI-rule-generation engine generates the rules based on training data derived from log data generated by the network to be managed.

In one embodiment, a network management system may be used to change the configuration and/or topology of the communication network according to the continuously evolving changes of loads and customer requirements. As the communication network changes, the log data changes, new training data is derived, and the AI-rule-generation engine should generate an updated set of rules. The AI-rule-generation engine requires very rich training data, which means that the communication network should be operated for a relatively long time to generate the log data from which the training data is derived. Therefore, the rules used by the AI-analysis engine may be always outdated.

As such, there is thus a need for addressing these and/or other issues associated with the prior art.

SUMMARY

A system, method, and computer program product are provided for training an AI-based network management system, in accordance with one embodiment. In use, log data and first network configuration data are received for a first configuration of a communication network. Additionally, second network configuration data is received for a second configuration of the communication network. Further, simulated log data is produced for the second configuration of the communication network, based on the log data and the second network configuration data.

DETAILED DESCRIPTION

Figure 1:
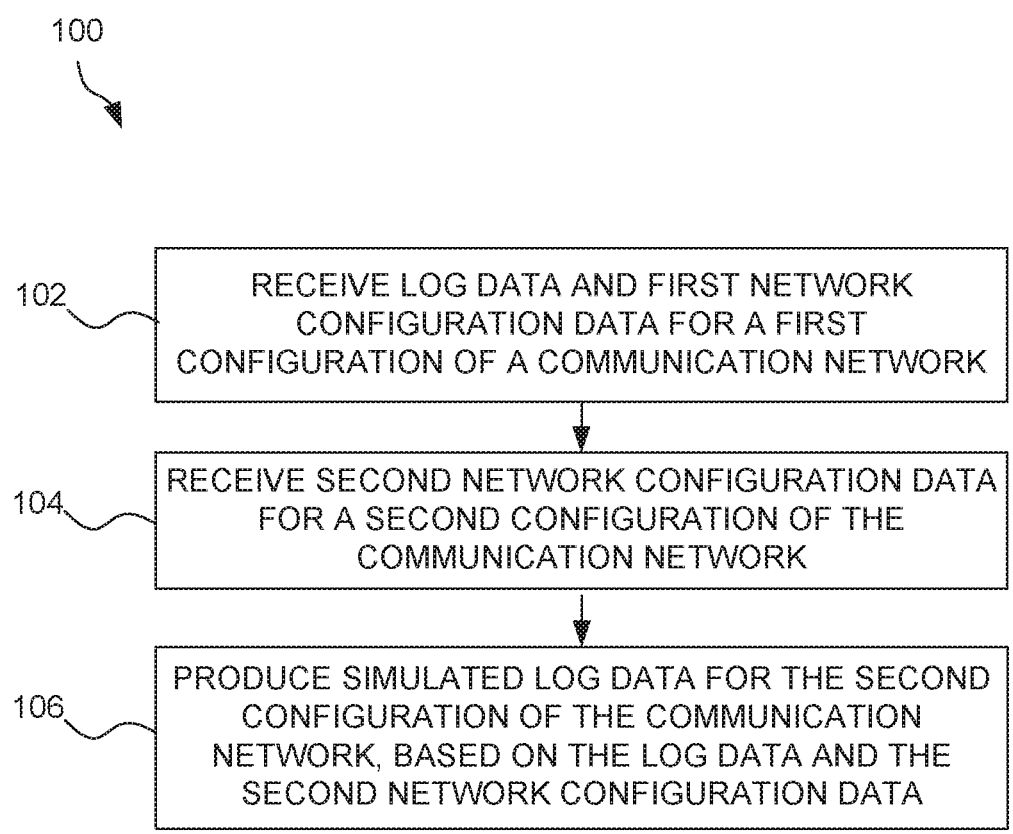
FIG. 1 illustrates a method for training an AI-based network management system, in accordance with one embodiment.

A modern public digital communication network provides many communication-related services to a very large number of customers where each customer may use a variety of services. Additionally, each service may be used by each customer in a variety of ways. In one embodiment, the business needs of many customers may rapidly change, thereby affecting the manner in which the communication services may be used. As such, business dynamics (and especially increasing business dynamics) may affect the network dynamics, as well as the configuration of the network and the network's services.

One purpose of Network Function Virtualization (NFV) is to implement as many functions of the network as software running over a generic computer. As such, a virtual(ized) network function (VNF) can be instantiated almost anywhere on the network, based on a network/cluster of generic computers. This ability to instantiate VNFs allows network functions to be migrated throughout the network, which in turn, may lead to network reconfiguration. Additionally, fast migration and network reconfiguration may provide cost savings in both capital spending (CAPEX) and operational spending (OPEX).

In the context of the present description, the term "cost" may refer to any type of expenditure (such as associated with increased capital expenditure (CAPEX), and/or increased operational expenditure (OPEX)), as well as decreased revenues or a limitation on revenue increase. In one embodiment, OPEX may include, for example, a cost of electricity to power any network entity and/or dissipate heat resulting from the operation of any network entity. Additionally, OPEX may also include payment to any third party for using any type of hardware and/or software, including processing power, storage, transmission, etc.

Further, in the context of the present description, the term service configuration" may refer to a network configuration applicable for a particular service. Such particular service may be requested by, and/or proposed to, a particular customer (herein referred to as "requesting party"), for a specific time period, locality, and/or business structure. As such, a service configuration may apply to an entire basis or subset of a communication network(s).

For example, instead of planning a network to a combined worst case (such as a highest expected cumulative demand), CAPEX can be reduced by more accurately planning the network according to an optimized, time-dependent configuration. Thereafter, OPEX can be reduced in periods of low demand by migrating the operating VNFs to one or more central locations and shutting down unused data centers. This cost saving may be one the driving forces behind NFV. Therefore, fast and effective reconfiguration of the network may be a key element in the evolution of NFV and the telecom market.

In addition, the ability to reconfigure the network quickly (and cost effectively) may enable network operators to introduce new services faster, reduce time-to-market, and reduce onboarding costs. Fast and automatic reconfiguration also enable customers to place a demand for a service (e.g., a service level agreement or SLA) shortly before actual use, and request the service for a limited time. Together, fast and automatic reconfiguration may reduce the time and cost of doing business between network operators, operators of software service(s), and/or customers (such as consumers).

The network may be expected to adapt to a constant flow of service demands by continuously optimizing and reconfiguring the network. An optimized network (configuration) may include a network that runs close to its current maximum capacity while providing all required services (based on service level agreements (SLAs) or a similar form of service requirements definition). As the actual (real-time) demand changes, the network configuration may be changed, both by adding or removing infrastructure (e.g., turning hardware on or off), and by migrating and instantiating, or removing VNFs.

The network management system should be able to predict situations requiring network reconfiguration early enough to enable the network to compute the optimized new configuration and effect (orchestrate) it before the actual need arises. Due to the network complexity and the speed of change of demands, the use of artificial intelligence (AI) may be required to meet such a technical demand.

As such, the network management system may generally relate to telecommunications and/or data communications, and, more particularly to the management of a telecommunication network and/or a data network, and, more particularly to network management using artificial intelligence (AI).

FIG. 1 illustrates a method 100 for training an AI-based network management system, in accordance with one embodiment. It should be noted that, in one embodiment, the AI-based network management system (including, but not limited to, an AI-analysis system and an orchestration system) may be used to maintain a quality of services provided to network customers. Additionally, it may be used to reduce operating costs (including by shutting down resources to reduce energy consumption). In one embodiment, the AI-based network management system, and particularly the AI-analysis engine, may detect and/or predict load-changes to change a network configuration in time to avoid service deterioration and to exploit cost reduction.

In one embodiment, improving the ability of the network management system to detect and predict load-changes, an AI-analysis engine and/or the orchestration system may make changes to monitoring rules by changing a rate of monitoring a function or by changing a threshold for reporting a change of a particular parameter monitored, for example.

As shown, log data and first network configuration for a first configuration of a communication network are received. See operation 102. In the context of the present description, a "network configuration" may refer to any type of arrangement, configuration, topology, etc., of a network and/or interconnected computing devices (such as cloud computing), and/or network nodes, and/or servers. Additionally, the network configuration may also include any type of arrangement, deployment, installation, instantiation, etc. of any type of software processed and/or executed by any computational entity in the network. Further, the network configuration may include a configuration of any type of communication service. In one embodiment, a communication service may include one or more network hardware elements as well as one or more software packages installed and operative in one or more hardware elements of the network. In the context of the present description, a hardware element, and/or hardware component, and/or hardware entity, may refer to any computation device including but not limited to processor, memory, storage, bus, communication adapter, and any type of computing peripheral. In one embodiment, such a computational device may be a computer, a server, a network node, a client device, etc.

Additionally, second network configuration data for a second configuration of the communication network is received. See operation 104. Moreover, simulated log data is produced for the second configuration of the communication network, based on the log data and the second network configuration data. See operation 106. In one embodiment, the simulated log data may be used to supplement the log data, the simulated log data and the log data being used to train an AI-learning engine. In another embodiment, the simulated log data may be used if the first configuration lacks a threshold amount of log data. For example, the amount of log data may be determined to be below a predetermined threshold, and the simulated log data may be applied to the network configuration data to produce additional simulated log data.

Further, the log data may be applied to the network configuration data and may include using simulation rules based on the log data. In another embodiment, the log data may be applied to second network configuration data of the second configuration of the communication network to produce testing data.

In the context of the present description, data-set, training data, and testing data may all refer to data used in AI such as deep learning and/or machine learning, to enable an AI system to develop a rule-base or a similar form of operational (actionable) knowledge. In one embodiment, the training data and testing data may be derived from a same data-set, where the training data is used to train the AI engine to produce a rule-base, and the testing data is used to evaluate the effectiveness of the developed rule-base. Additionally, the log data can be used as a data-set. In one embodiment, the testing data may be used to test the analysis rules.

In the context of the present description, a "particular rule-base" may refer to a rule-base derived from a data-set associated with a particular network configuration and/or topology, or a particular spectrum of network configurations and/or topologies.

In another embodiment, the log data may be analyzed to produce a third configuration of the communication network. Additionally, the log data may include at least one of identification of a network event of the communication network, and identification of a current network configuration for the communication network.

Moreover, in another embodiment, an AI-learning engine may be trained using simulated log data. In another embodiment, the AI-learning engine may create analysis rules to analyze the log data. In yet another embodiment, an AI-learning engine may be trained based on the log data and the simulated log data, where the AI-learning engine defines a predictor period for a time of operation of the first configuration of the communication network.

In the context of the present description, a "predictor period" may refer to a period of time over which network events are tracked to detect the particular sequence of events that determines a particular predictor, and/or determines the particular predictor with a particular (and/or predetermined) level of confidence. In still another embodiment, an AI-learning engine may apply a difference measure to evaluate the first configuration against the second configuration.

In one embodiment, a predictor period may be longer than the time of operation of the current network configuration. As such, the AI-analysis engine may consider events occurring prior to the change in the current network configuration (i.e., past events occurring during a pervious network configuration). Additionally, a weighting factor may be applied to past events. In one embodiment, the AI-analysis engine may use a particular rule to properly weigh each past event while considering a particular predictor. Further, the time of operation may include at least one of first network events occurring prior to the first configuration being implemented, second network events occurring after the first configuration is implemented, and third network events occurring during a subset of time after the first configuration is implemented.

In the context of the present description, "log data" may refer to a file, repository, or a database, including records, where a record may represent an event detected in the network. In one embodiment, an event may be detected by one or more network nodes or servers, by software executed by such network nodes or servers, and/or by a network management system and/or software, including, but not limited to, a network orchestration system or software, and/or by a network-monitoring system.

In one embodiment, a log record may include identification of the event, associated data characterizing the particular event, and/or identification of the current network configuration and/or topology. Additionally, software executed by network nodes or servers may include the operating-system (OS), a hypervisor software, a virtual machine, a container, a virtual network function (VNF), and/or a micro-service.

Figure 2A:
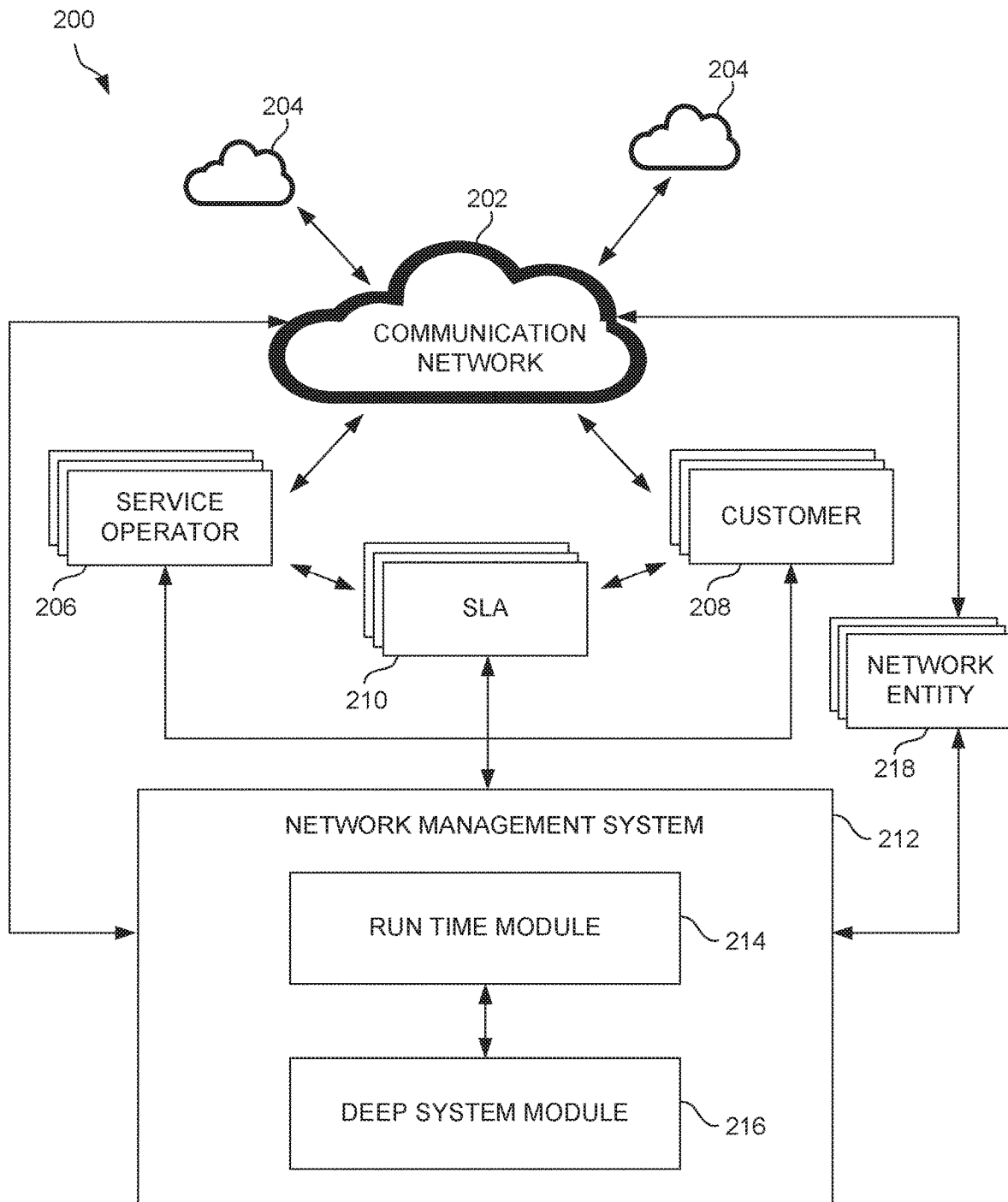
FIG. 2A illustrates a communication network and network management system, in accordance with one embodiment.

FIG. 2A illustrates a communication network and network management system 200, in accordance with one embodiment. As an option, the network management system 200 may be implemented in the context of any one or more of the embodiments set forth in any previous and/or subsequent figure(s) and/or description thereof. Of course, however, the network management system 200 may be implemented in the context of any desired environment. Further, the aforementioned definitions may equally apply to the description below.

In one embodiment, the communication network and network management system 200 may relate to managing a communication network using artificial intelligence (AI).

As shown, the network management system 200 includes a communication network 202, one or more secondary networks 204, a network management system 212 including a run-time module 214 and a deep system module 216. In one embodiment, the one or more secondary networks 204 may be communicatively coupled to the communication network 202.

Communication network 202, and/or any of the one or more secondary networks 204 may be associated with one or more service operators 206 (such as operators of third-party services such as software as a service (SaaS)), customers (such as communication customers 208 and/or consumers using the services of communication network 202 or any of the software services of service operators 206). In one embodiment, a customer of the communication network 202 may be a service operator (such as service operators 206) or a service consumer (such as the communication customers 208). Both the service operator or the service consumer may use services of the communication network 202, as well as services provided by a service provider. Further, the communication network 202 may be connected directly to the network management system 212, and/or may be connected to one or more network entities 218.

In one embodiment, the service operators 206 and/or the communication customers 208 may have an arrangement and/or agreement with an operator of communication network 202, such as one or more service level agreements (SLAs) 210, which may define various parameters of the service(s) provided by communication network 202.

In the context of the present description, the term "communication network", and/or simply "network", may refer to any type of network, including analog and/or digital communication networks, wired and/or wireless communication networks, wide area network (WAN), local area network (LAN), personal area network (PAN), etc., as well as combinations thereof. For example, network may refer to a public service telephony network (PSTN), a public service data network (PSDN), a public land mobile network (PLMN), cellular network, and/or cable network, as well as any other network type and any combination thereof. Further, the term network may include communication hardware, communication software and/or both.

A network may also refer to a sub-network, any type of a part of a network, or a combination of networks, and/or sub-networks, any of which may be overlying and/or overlapping one or more networks and/or subnetworks (such as a virtual network, and/or a network slice, etc.).

In one embodiment, a network may be operated by a network operator, a virtual network operator (VNO), a mobile virtual network operator (MVNO), a business enterprise operating one or more communication services, a business enterprise subscribing to one or more communication networks, one or more virtual communication networks, and/or one or more communication services, etc.

In the context of the present description, the term "network entity" may refer to any type of communication hardware, communication software, and/or communication service including instances of any particular software and/or service. For example, network entity may refer to software executed by a network entity (such as a network node or server), an operating-system (OS), a hypervisor software, a virtual machine, a container, a virtual network function (VNF), a micro-service, etc.

Further, in the context of the present description, the term "network configuration" may refer to any type of arrangement, configuration, topology, etc., of a network, interconnected computing devices (such as cloud computing), network nodes, servers, network entities, etc. In one embodiment, the network configuration may relate to a part (or slice) of a network, or a sub-network. Additionally, network configuration may also refer to any type of arrangement, deployment, installation, instantiation, etc. of any type of software processed and/or executed by any computational entity in the network.

In one embodiment, network configuration may refer to a configuration of any part of a network, or a combination of network, including network slicing, self-organizing networks (SON), edge computing, etc. Network configuration may also include configuration of any type of "communication service", which may include one or more network hardware elements as well as one or more software packages installed and operative in one or more hardware elements of the network.

In the context of the present description, "network service" may refer to any combination of network or communication services, facilities, or resources, as well as associated parameters such as bandwidth, latency, jitter, etc. For example, a network service may include any type of computing services, facilities, resources, as well as their parameters such as processing power, memory, storage, etc. Further, in one embodiment, network service may include a communication service, such as required network service, proposed network service, and/or communication service requirements (such as requirements specified in the SLAs 210).

Figure 2B:
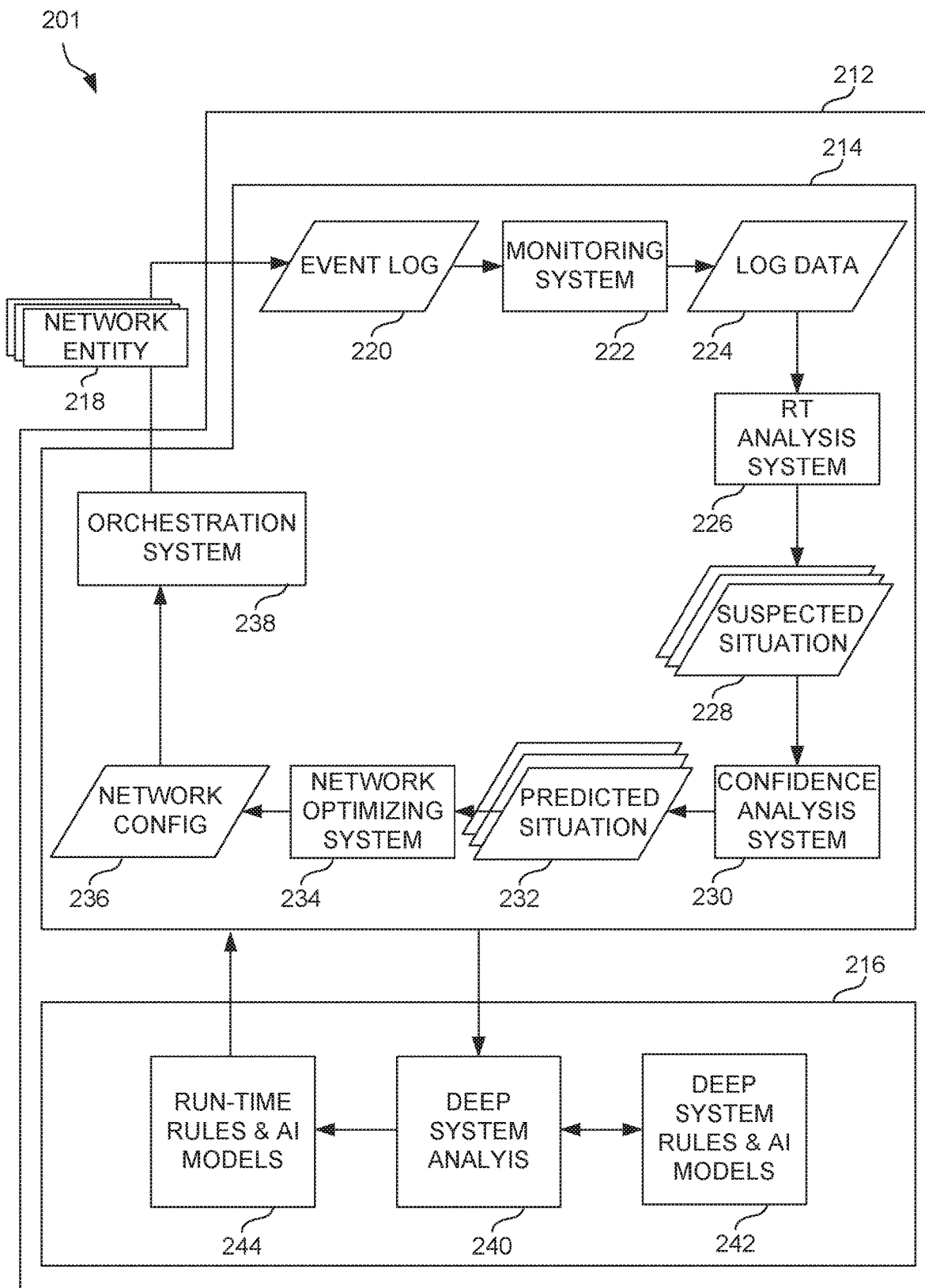
FIG. 2B illustrates a network management system, in accordance with one embodiment.

FIG. 2B illustrates a network management system 201, in accordance with one embodiment. As an option, the network management system 201 may be implemented in the context of any one or more of the embodiments set forth in any previous and/or subsequent figure(s) and/or description thereof. Of course, however, the network management system 201 may be implemented in the context of any desired environment. Further, the aforementioned definitions may equally apply to the description below.

In one embodiment, communication network 202 may include one or more network entities 218 that provide communication services of the communication network 202. For example, the network entities 218 may be arranged in a particular configuration optimized to deliver the communication services (of the communication network 202) according to the one or more SLAs 210. The network management system 212 may determine, implement and manage such optimized configuration of the network entities 218. Additionally, configuration of the network entities 218 may be associated with the deep system module 216, and in particular, the run-time module 214 through use of run time rules and/or AI-models 244, while the deep system module 216 may create, adapt and modify the run-time rules and/or AI-models 244, as well as deep system rules and/or AI models 242 by which the deep system module 216 operates.

In addition, the network management system 212 may include the run-time module 214, which may include an event log, 220, a monitoring system 222, log data 224, a real-time (RT) analysis system 226, one or more suspected situations 228, a confidence analysis system 230, one or more predicted situations 232, a network optimization system 234, network configuration 236, and an orchestration system 238. In one embodiment, the network entities 218, the monitoring system 222, the RT analysis system 226, the confidence analysis system 230, the network optimization system 234, and the orchestration system 238 may function as system components. Similarly, the event log 220, the log data 224, the one or more suspected situations 228, the one or more predicted situations 232, and the network configuration 236 may function as data elements.

The one or more network entities 218 may compute and communicate to the monitoring system 222 the event log 220, typically including values for parameters relating to the performance of the communication network 202 and/or the one or more network entities 218. The monitoring system 222 may then collect the event log 220 (including data records) to create the log data 224. RT-analysis system 226 may then analyze the log data 224 to detect the one or more suspected situations 228. Confidence analysis system 230 may then collect, compare and analyze the one or more suspected situations 228 to determine one or more predicted situations 232. Based on the current predicted situation of the one or more predicted situations 232 the network optimization system 234 may create an optimal network configuration 236. Next, the orchestration system 238 implements the optimal network configuration 236 by reconfiguring the one or more network entities 218.

In one embodiment, deep system module 216 may supervise the operation of the run-time module 214. For example, the run-time module 214 may operate on the basis of run-time rules and/or AI-models 244, which in turn are created and/or managed by the deep system analysis system 240 which operates on the basis of deep-system rules and AI models 242. The deep system analysis system 240 may be a collection of systems, arranged for example in stratified levels with their respective deep-system rules and AI models 242, as explained hereinbelow.

Further, the run-time rules and AI models 244 as well as the deep-system rules and AI models 242, may be created manually, or automatically using respective AI-learning systems operating in the deep system module 216. For example, the deep system module 216 may include any AI learning and/or RT-analysis system (including, for example, AI learning system 510 hereinbelow described). Further, the run time rules and AI models 244 as well as the deep system rules and AI models 242, may be updated, modified and/or adapted manually, or automatically using respective AI-analysis (serving) systems operating in the deep system module 216.

In one embodiment, an entity operating a network may use the network management system 212 and/or the orchestration system to manage one or more network configurations. Additionally, in the context of the present description, the term "configuration change" and/or "reconfiguration" may refer to any type of change in network configuration. In one embodiment, the type of change may include a load-change, network fault, preventive maintenance, cyber-attack, etc. Additionally, a network optimizing system (such as network optimizing system 234) and/or orchestration system (such as orchestration system 238) may analyze load conditions, requirements, and/or changes to determine if a configuration change is necessary, and if so, determine optimal configuration settings, including generating and/or applying a configuration change.

In one embodiment, a configuration change may be analyzed, determined and affected by an AI-based network optimizing system 234 and/or orchestration system 238 using one or more artificial intelligence (AI) engines. Such an AI-engine may use AI rules (e.g., AI-Model(s)), which may be created by an AI-engine using deep learning and/or machine learning technology to analyze training data based on, or sourced from, log data. For example, the AI-based network optimizing system 234 and/or orchestration system 238 may use AI rules (AI-Models) to analyze load-changes, determine a configuration change, and/or effect an appropriate configuration change.

In the context of the present description, the term "load" may refer to any type of network characteristic, parameter, and/or service. For example, load may include bandwidth, latency, jitter, processing power, memory, storage, etc. Additionally, load may include any requirement (such as used by such network characteristic, parameter, and/or service). Additionally, the term "load-change" may refer to any change in load. For example, load-change may include a change of a load requirement, use, and/or consumption, associated with a network characteristic, parameter, and/or service. In one embodiment, load-change may cause a configuration change. As such, load-change may include other causes for a configuration change, such as a network fault, anticipated network fault (such as requiring preventive maintenance), cyber-attack and/or security breach, etc. Further, load-change may include a change in load (such as a load decrease) that may be used in turn to shut down equipment and reduce operating costs or may include an anticipated load-change which may be used to anticipate the development of a particular load-change.

Additionally, in the context of the present description, the term "log data" may refer to any record (including a file, repository, and/or database) which may represent an event detected in the network. Such an event may be detected by one or more network nodes or servers, by software executed by such network nodes or servers, by a network management system or software (including, but not limited to, a network orchestration system or software), and/or by a network-monitoring system. Additionally, the log data may include identification of an event (such as a network event), associated data characterizing the particular event, and/or identification of the current network configuration or topology. As such, log data may include event-log data as well. In one embodiment, log data may include a link to a file, repository, and/or database, or may be included within an application programming interface (API) for such file, repository, and/or database. If log data is communicated, it may be communicated in a computer readable format such as XML.

Further, log data may be used to train and/or test an AI-engine (including an AI-based network design and/or management system).

In the context of the present description, the term "characterization" may refer to defining any type(s) of network or communication services, facilities, resources, etc. For example, characterization may include defining a network service that is required, including associated computing services, facilities, resources, etc. In one embodiment, characterization may include the term "characteristic".

Moreover, in the context of the present description, the term "current network configuration" and/or "current network topology" may refer to a network configuration and/or topology in use at the time of logging an event and/or at the time of executing a rule. Additionally, the term "configuration representation" may refer to a mechanism that can represent a network configuration. For example, configuration representation may include software (e.g., VNF) deployment, service definitions, respective allocation of network and processing resources (e.g., bandwidth, latency, jitter, etc., processing power, memory, storage, etc.). A configuration representation may enable re-creation of a particular network configuration and/or topology, may enable simulation or emulation of the operation of a particular network configuration and/or topology, and/or may enable identification of a re-occurrence of a particular network configuration and/or topology.

Further, in the context of the present description, the term "network situation" may refer to a condition of the communication network (such as communication network 202) that may require a configuration change, or network reconfiguration. The network situation may be an unwanted situation (such as a failure), or a wanted situation (such as an opportunity to reduce cost, for example, by turning off a network entity). The network situation may be determined for the communication network (or any part of the communication network), for a service (or any part of the service), and/or for a network entity (such as one or more network entities 218), etc.

For example, the network situation may be determined for a particular SLA (such as one of the one or more SLAs 210). A network situation associated with an SLA may represent a situation where the network (or an associated service) does not perform according to the SLA. As such, the characteristics of the network situation may be any collection of parameters representing a fault or an opportunity (e.g., to reduce cost), etc. Such cause for the network situation may be associated with a load, or a load change.

Additionally, the network situation may be associated with a network fault (such as a hardware fault and/or a software fault), anticipated network fault (such as requiring preventive maintenance), cyber-attack, and/or security breach, etc.

In one embodiment, the network management system (such as network management system 212) may be used to detect a developing network situation before it adversely affects the network behavior, or to exploit an opportunity to save cost.

In this respect, in the context of the present description, the term "death expectancy" may refer to a period of time remaining for a particular predicted network situation until it adversely affects a particular service and/or SLA.

In one embodiment, the term or "minimal reconfiguration time", may refer to the minimal period required to reconfigure the network to avoid a respective failure, or to exploit a respective opportunity. For example, to resolve a predicted situation before it adversely affects the particular service and/or SLA. Therefore, the minimal reconfiguration time should be smaller than the death expectancy.

In one embodiment, resolving a particular predicted situation may be delayed until the death expectancy approaches the respective minimal reconfiguration time. Additionally, death expectancy may also refer to a period of time remaining to exploit a particular predicted situation.

Further, the term "life expectancy" may refer to a period of time where the particular network configuration may remain useful before the utility diminishes (and it may then be in need of being replaced with a different network configuration).

Figure 2C:
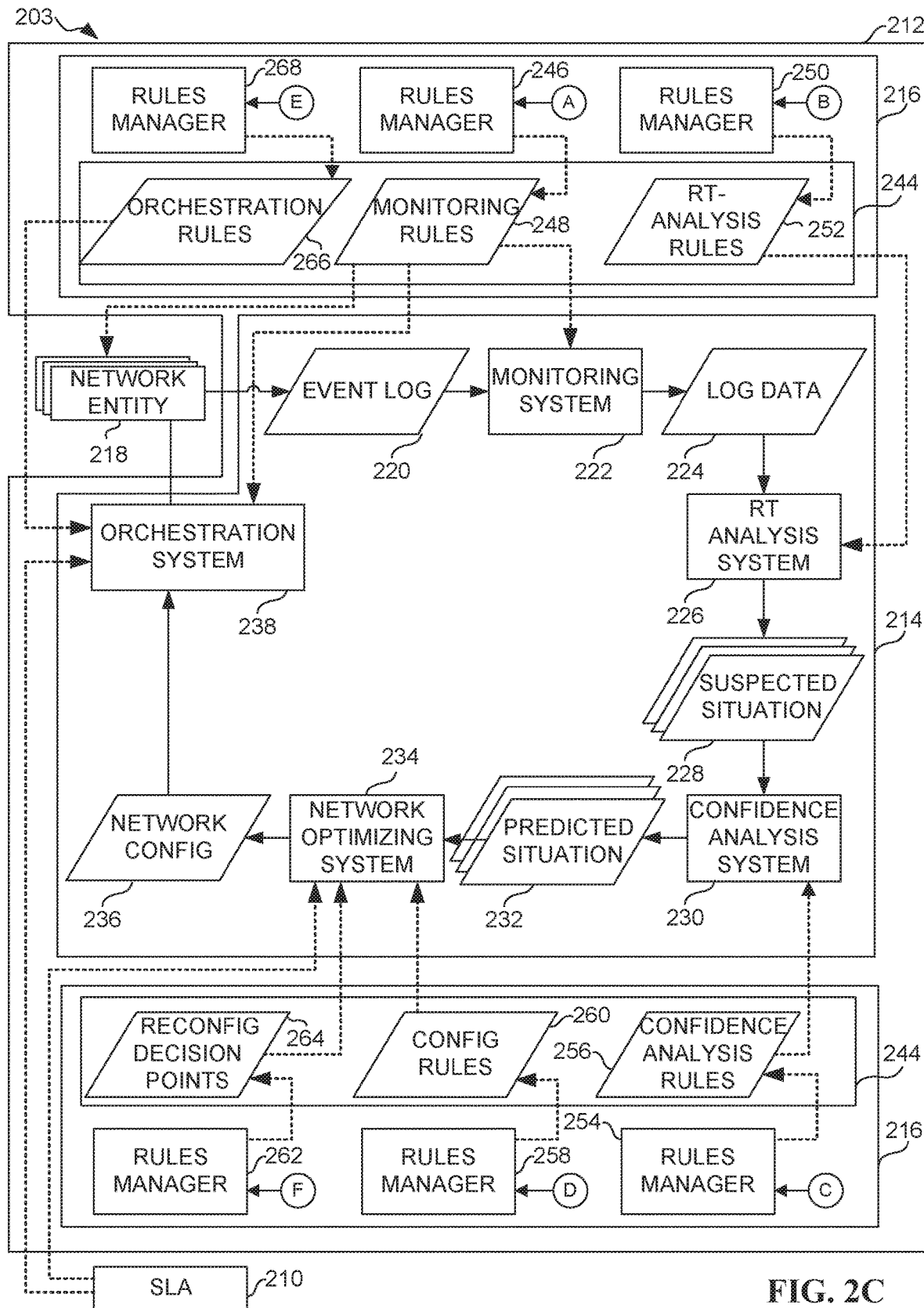
FIG. 2C illustrates a network management system, in accordance with one embodiment.

FIG. 2C illustrates a network management system 203, in accordance with one embodiment. As an option, the network management system 203 may be implemented in the context of any one or more of the embodiments set forth in any previous and/or subsequent figure(s) and/or description thereof. Of course, however, the network management system 203 may be implemented in the context of any desired environment. Further, the aforementioned definitions may equally apply to the description below.

As shown, the network management system 203 includes the network management system 212 which includes run-time module 214 and run-time rules and/or AI-models 244 of deep system module 216.

Run-time rules and/or AI-models 244 may be in communication with various components of the run time module 214, such as: monitoring rules 248 (in communication with monitoring system 222), real time (RT)-analysis rules 252 (in communication with RT analysis system 226) which may be used to analyze the log data 224 and/or to detect the one or more suspected situations 228, confidence analysis rules 256 (in communication with confidence analysis system 230) to analyze the one or more suspected situations 228 and determine the one or more predicted situations 232, configuration rules 260 (in communication with the network optimization system 234 and/or the reconfiguration decision points 264) to analyze the one or more predicted situations 232 and create network configurations 236, reconfiguration decision points 264 (in communication with configuration rules 260 and network optimizing system 234), and orchestration rules 266 (in communication with orchestration system 238) to implement the network configuration 236.

The run-time module 214 may also receive data including from SLAs 210. Of course, any of the monitoring rules 248, RT-analysis rules 252, confidence analysis rules 256, configuration rules 260, reconfiguration decision points 264, and/or orchestration rules 266 may be in communication with any specific element of run-time module 214.

Configuration rules 260 may be used by the Network Configuration 236 to create an optimal network configuration according to a network infrastructure, a current state of the network, available predictions of near-future network behavior, SLAs (or similar requirement definitions), cost considerations, available resources, etc. In one embodiment, cost considerations may include the cost of installing, updating and/or synchronizing a new network entity and/or a new virtual network function, moving data from one new network entity (and/or virtual network function) to another network entity (and/or virtual network function), and/or the cost of specific resource in a specific location, etc.

Reconfiguration decision points 264 may include network situation(s) where a new network configuration may be computed and determined. For example, a reconfiguration decision point may be determined according to a predicted situation, or a combination of predicted situations. Additionally, the network optimizing system may determine a point in time when a new network configuration may be required by applying rules associated with the reconfiguration decision points 264 (which may relate to the predicted situations 232). Additionally, a predicted situation data may contain sufficient information (such that an action can be implemented via the network optimizing system 234) about a near future predicted behavior of particular network entities. Further, the network optimizing system 234 may receive current values and corresponding near-future predictions of value changes for any and all parameters of all the network entities 218.

In the context of the present description, a reconfiguration decision point includes a situation where a new network configuration may be computed and determined. In one embodiment, a reconfiguration point may be determined according to a predicted situation, or a combination of predicted situations.

It is appreciated that each collection of rules such as monitoring rules 248, RT-analysis rules 252, confidence analysis rules 256, configuration rules 260, reconfiguration decision points 264, and orchestration rules 266, may be implemented in the form of a file, a repository, or a database. Additionally, such implementation may include a same entity (e.g., file, repository, etc.) for all rules, or may include a different entity (e.g., file, repository, etc.) for each collection of rules.

Additionally, each collection of rules may apply to one or more systems. For example, monitoring rules 248 may apply to network entities 218, monitoring system 222, and/or orchestration system 238. Monitoring rules 248 may direct each of the network entities 218 how and when to report an event log 220, including specifying parameters and/or values to report, etc. Further, monitoring rules 248 may direct monitoring system 222 how to arrange the log data 224.

Further, each collection of rules may be managed by one or more systems. For example, monitoring rules 248 may be created and/or modified by one or more administrators as well as by monitoring system 222, orchestration system 238, and/or confidence analysis system 230. Therefore each collection of rules may be managed by a rules manager, which may receive inputs via a respective hook and determine the respective rule change. In particular, monitoring rules 248 may receive input from rules manager 246, RT-analysis rules 252 may receive input from rules manager 250, confidence analysis rules 256 may receive input from rules manager 254, configuration rules 260 may receive input from rules manager 258, reconfiguration decision points 264 may receive input from rules manager 262, and/or orchestration rules 266 may receive input from rules manager 268.

In one embodiment, each collection of rules may be formed to enable simple addition, removal, selection, and/or deselection (prunning) of rules. Additionally, a system providing an input to any collection of rules (such as monitoring rules 248, RT-analysis rules 252, confidence analysis rules 256, configuration rules 260, reconfiguration decision points 264, and/or orchestration rules 266) may create a new rule, remove a rule, select/deselect (prune) a rule, and/or modify parameters of a rule.

A rules manager (such as any, some, or all of rules manager 246, 250, 254, 258, 262, and/or 268) may eliminate and/or reduce repetitive, too frequent, and/or possibly conflicting rule changes by implementing hysteresis and/or a dead-time period, a majority vote, weights and priorities, etc. For example, a system creating a rule may have priority and/or preference over any other system with respect to a particular rule. Additionally, the system may be particular to the rule managers 246, 250, 254, 258, 262 and/or 268 to prevent an over-ruling event where a first system runs-over a second (or another) system.

In the context of the present description, the term "parametrization" may refer to defining one or more values, or range(s) of values, for any characteristic of the required network or communication service, facility, resource, etc. In one embodiment, parametrization may include alternative acceptable values, or value ranges, with alternative respective priorities. The term "prioritization" may refer to defining priorities for, or between, the various required network or communication services, facilities, resources, etc., as well as their respective parameters.

Additionally, in the context of the present description, the term "weighting" may refer to defining and/or associating evaluation weights to characteristics and/or parameters for computing at least one value. In one embodiment, weighting may include a weighting factor. Additionally, the at least one value may be used for evaluating a particular proposed network service with a minimum requirement, and/or comparing between alternative proposals.

Monitoring rules 248 may instruct the one or more network entities 218 which parameters (such as parameters of the event log 220) to measure, when to measure each parameter, how to measure the parameter, and how to report any measurement. Additionally, one or more network entities may derive the rules directly from a database associated with the monitoring rules 248, or receive the rules from the monitoring system 222 periodically, or per a preconfigured schedule. In another embodiment, the monitoring rules 248 may instruct the monitoring system 222 how to measure inter-network entity parameters, including parameters involving, correlating, or synchronized between, more than one network entity of the one or more network entities 218. Further, the monitoring rules 248 may instruct the monitoring system 222 how to create, format, arrange, and/or maintain a log data file (such as log data 224) or a database associated with the log data 224. In this manner, the monitoring rules 248 may be conditional upon network situations, and transform according to such network situations (including a progression of the network situations).

The monitoring rules 248 may additionally guide the orchestration system 238 where to instantiate a monitoring probe. After the monitoring probe is instantiated, the monitoring system 222 may instruct such probe (or a monitoring function, or any other reporting network entity) which parameter (or parameters) to measure and report, a frequency of reporting, and a timing to report, such as when a measured value crosses a particular (or preconfigured) threshold, or characteristics of a particular service follow a particular temporal pattern (such as set time intervals, etc.).

Figure 3:
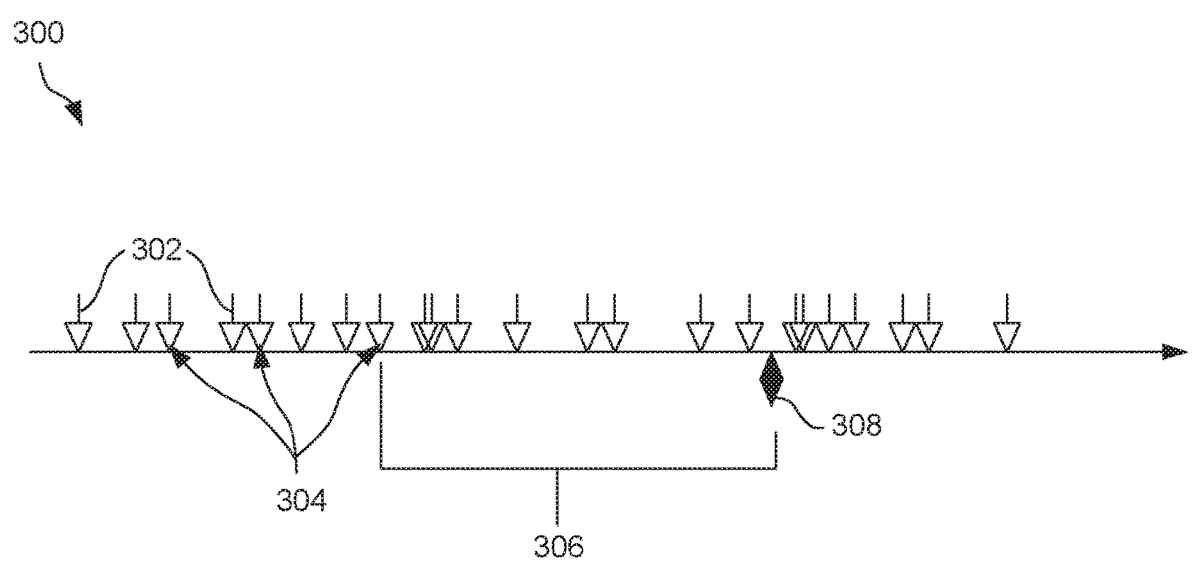
FIG. 3 illustrates an event-log timeline, in accordance with one embodiment.

FIG. 3 illustrates an event-log timeline 300, in accordance with one embodiment. As an option, the event-log timeline 300 may be implemented in the context of any one or more of the embodiments set forth in any previous and/or subsequent figure(s) and/or description thereof. Of course, however, the event-log timeline 300 may be implemented in the context of any desired environment. Further, the aforementioned definitions may equally apply to the description below.

As shown, event-log timeline 300 includes event-log records 302, including log-pattern/classifier 304, and a label for a particular network situation 308.

The log-pattern/classifiers 304 precedes the particular network situation 308 by a time period 306. The time period 306 may be a minimal reconfiguration time. In one embodiment, the time period 306 may be larger or equal to the minimal reconfiguration time. Additionally, the particular pattern of the log-pattern/classifiers 304 may be construed as a classifier for the particular network situation indicated by a label for the particular network situation 308.

Figure 4A:
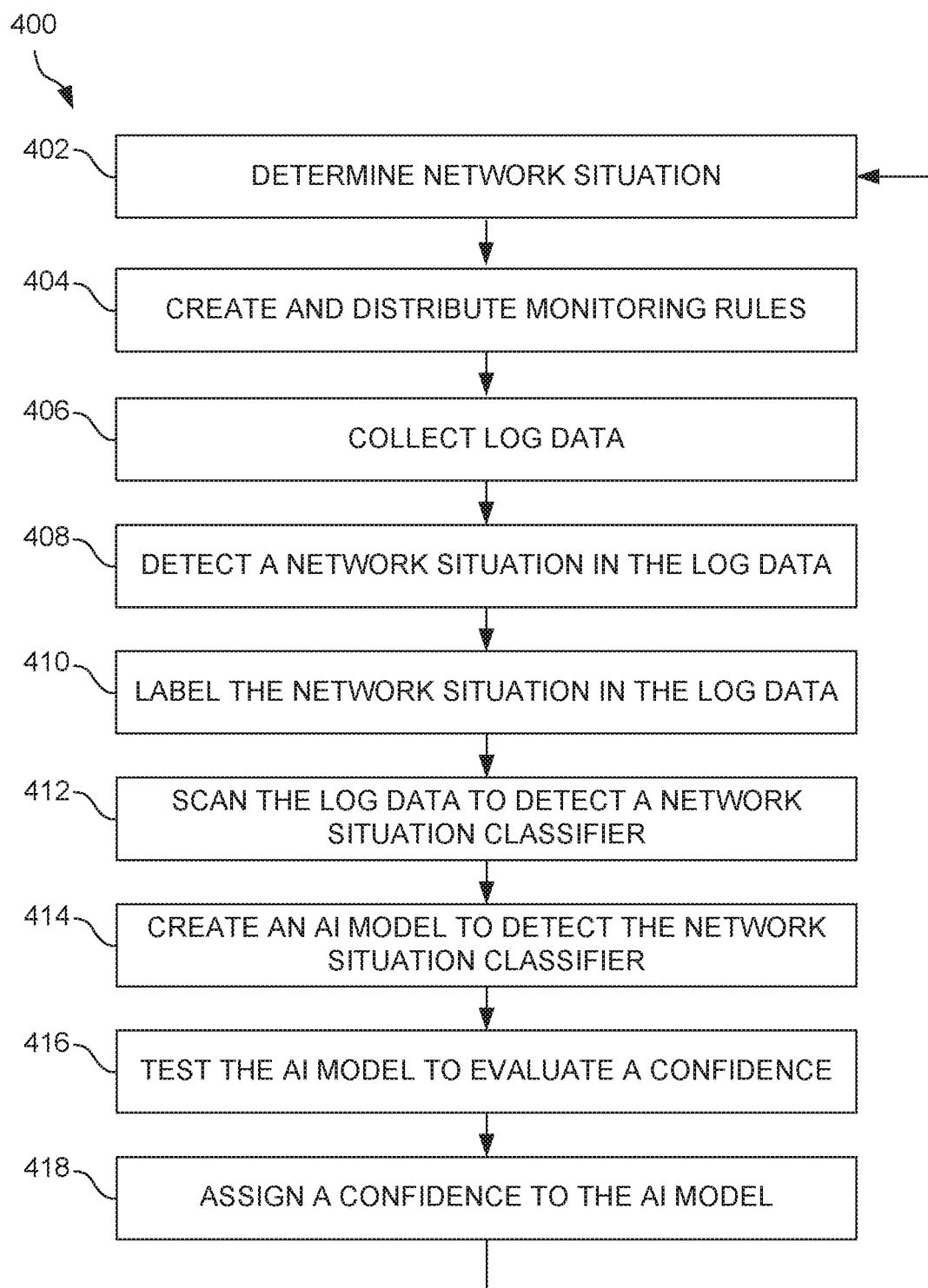
FIG. 4A illustrates a method for processing log data, in accordance with one embodiment.

FIG. 4A illustrates a method 400 for processing log data, in accordance with one embodiment. As an option, the method 400 may be implemented in the context of any one or more of the embodiments set forth in any previous and/or subsequent figure(s) and/or description thereof. Of course, however, the method 400 may be implemented in the context of any desired environment. Further, the aforementioned definitions may equally apply to the description below.

Method 400 shows part of log data (such as the log data 224) processed for creating an AI-model. In one embodiment, the method 400 illustrates a flow chart of a process for creating an AI-model for the RT analysis system 226. As shown, a network situation is determined. See operation 402. In one embodiment, determining the network situation may include also determining particular characteristics of the network situation. For example, a network situation may be an unwanted situation (such as a failure), or a wanted situation (such as an opportunity to reduce cost, for example, by turning off a network entity). A network situation may be determined for a network (or any part of a network), for a service (or any part of a service), for a network entity (such as network entities 218), etc. For example, a network situation associated with an SLA may represent a situation where the network (or an associated service) does not perform according to the SLA. As such, the characteristics of the network situation may be any collection of parameters representing a fault or an opportunity (e.g., to reduce cost), etc. Such cause for the network situation may be associated with a load, or a load change.

At operation 404, monitoring rules may be created and/or distributed. Such monitoring rules may be used to instruct a relevant network entity (of the network entities 218) to measure and report one or more parameters that may be relevant to a network situation(s). Additionally, the monitoring rules may instruct the network entity when to measure each parameter, and how to report any measurement. In one embodiment, a rate of measuring a parameter may be different (such as being more frequent) than a rate of reporting. Further, the reporting may be conditioned by a value measured (or calculated), such as an average value, rate of change of value, etc. Moreover, the monitoring rule may include instructions to locally store unreported measurement(s) for a predetermined span of measurements and/or time.

In another embodiment, a monitoring rule may instruct one or more network entities 218 and/or the monitoring system 222 to report values of parameters and/or characteristics for a particular service in a particular temporal pattern. For example, the event log 220 the or log data 224, may report a timely value of a parameter, or the time in which the value of a parameter crossed a predetermined threshold value, etc.

At operation 406, event-log records are collected, including, log data which may be relevant to the network situation as determined by the characteristics of the network situation.

Additionally, a network situation in the log data is detected in the log data. See operation 408. In one embodiment, the network situation may be detected based on characteristics of the network situation. At operation 410, the network situation in the log data is labeled. Further information relating to the log data and/or the event-log data may be found in FIG. 4.

At operation 412, the log data (such as log data 224) is scanned to detect a network situation classifier. In one embodiment, the log data may include training files used to determine a particular pattern of particular event-log records. Additionally, one or more training files may be created based on such log data. In one embodiment, the network situation classifier may include a particular sequence of parameter value(s) carried by log data (such as log data 224). Additionally, it may precede and/or predict, a network situation. Further, the particular sequence of parameter value(s) may be specific to a configuration of network entities (such as network entities 218) and services, as well as to the set of monitoring rules (such as monitoring rules 248) executed at that period.

At operation 414, an AI model is created to detect the networks situation classifier. For example, in one embodiment, one or more RT-analysis rules 252 (e.g., a rule-base) may be created for detecting the particular networks situation classifier. In the context of the present description, this rule-base, when created by an AI learning system (such as the RT analysis system 226), may be considered an "AI-model". It is to be appreciated that this network situation classifier and the respective AI-model (i.e., rule-base) may be particular to the network configuration for which the log data (such as log data 224) is collected. In one embodiment, the one or more RT-analysis rules 252 may be implemented as AI models created by an AI learning system (such as RT-analysis rules 252 that may be used by the RT analysis system 226 to detect a classifier in the log data 224).

Additionally, in the context of the present description, the term "particular rule-base" may refer to a rule-base derived from a data-set associated with a particular network configuration and/or topology, or a particular spectrum of network configurations and/or topologies. Further, a particular rule-base, especially in the context of an AI-learning system, may be equivalent to the term "AI-Model". AI-Model may therefore include any collection of rules generated by an AI-learning system, including a deep-learning system and/or a similar entity. The AI-Model may include data relating to a neural-network.

Further, the AI model may be tested to evaluate a confidence level. See operation 416. For example, the AI model may be tested using testing files, including testing files created from log data (such as the log data 224). The AI-model may be tested for a particular network situation classifier. Additionally, a measure of the confidence level may be calculated relating to the detection of a particular network situation classifier (such as an event-log pattern) by the particular AI-model. It is to be appreciated that this networks situation classifier and the respective AI-model may be particular to a specific network configuration for which the log data is collected.

In the context of the present description, the term "confidence level" may refer to any measure of confidence of detecting a classifier, and/or an event-log pattern, that may be associated with a particular suspected situation and/or predicted situation. For example, the confidence level may be measured/calculated according to a percentage of false-positive and/or false-negative detection of the particular classifier, and/or an event-log pattern. The measure of confidence level may represent a probability that, based on a particular suspected situation and/or predicted situation being detected, the particular suspected situation and/or predicted situation will develop. Further, confidence level may be represented simply by "confidence" particularly when associated with a confidence analysis such as a confidence analysis system and/or confidence analysis rules.

At operation 418, a confidence may be assigned to the AI model. For example, the AI-model may be outputted with a specific confidence level to a database associated with the RT-analysis rules 252. In one embodiment, the database may include RT-Analysis Rules 252 and thus may be accessed by the RT analysis system 226. Further, the database may be linked to the RT analysis system 226 and may contain the RT-Analysis Rules 252. After assigning a confidence to the AI model, method 400 may be repeated (starting back at operation 402) for any number of network situations, and/or to amend the confidence of the AI model based on an updated network situation.

In one embodiment, the RT-analysis rules 252 for a particular predicted situation may include a rules-base (such as an AI model) for detecting a sequence of event-log data (such as log data 224) preceding the predicted situation, and/or for reporting current values and corresponding near-future predictions of parameter value(s) changes in relation to any and/or all of the network entities 218 involved.

Figure 4B:
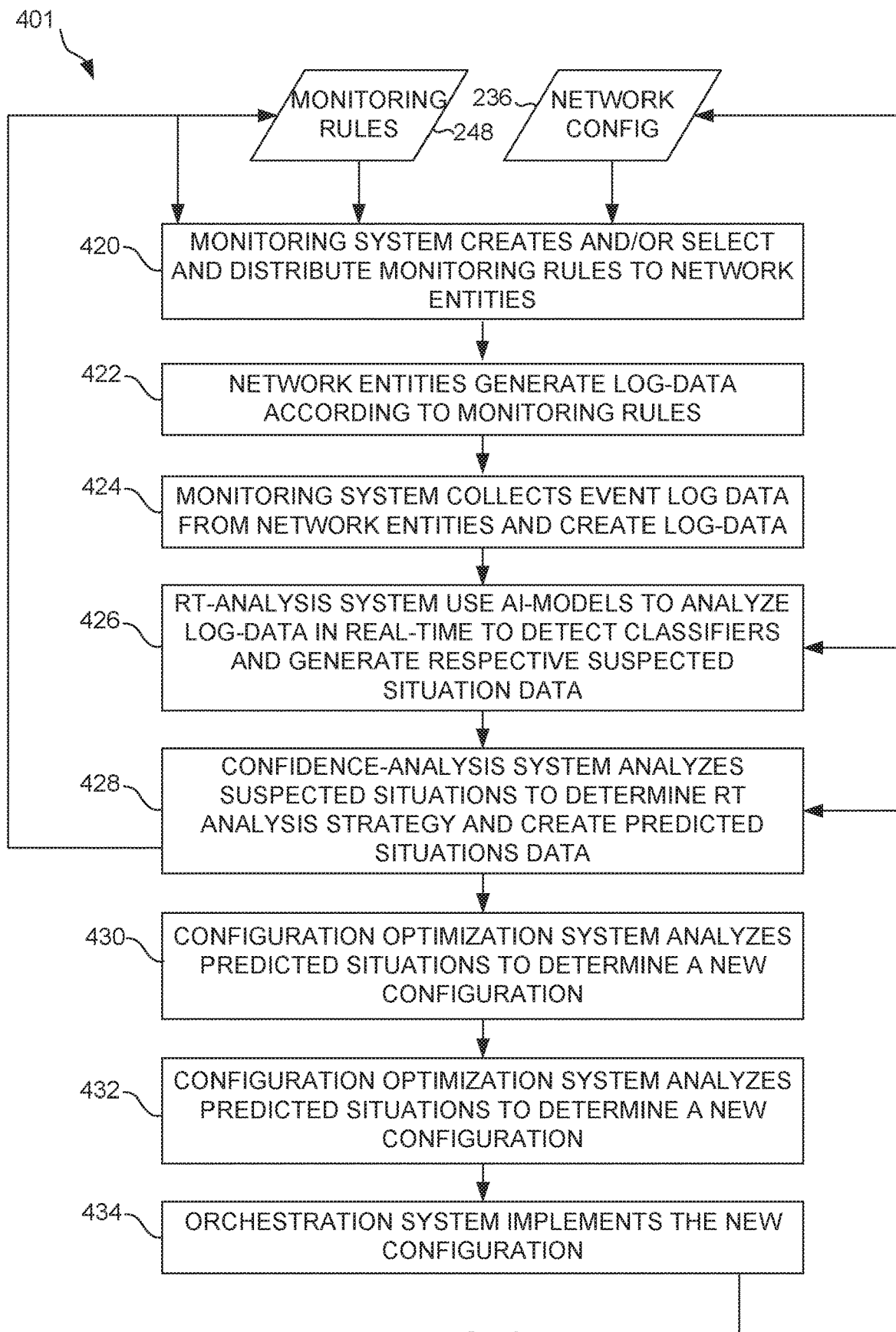
FIG. 4B illustrates a method of a run time process using an AI-model, in accordance with one embodiment.

FIG. 4B illustrates a method 401 of a run time process using an AI-model, in accordance with one embodiment. As an option, the method 401 may be implemented in the context of any one or more of the embodiments set forth in any previous and/or subsequent figure(s) and/or description thereof. Of course, however, the method 401 may be implemented in the context of any desired environment. Further, the aforementioned definitions may equally apply to the description below.

In one embodiment, the method 401 may show a run-time process which may be used by the run-time module 214. In one embodiment, the run-time module 214 may use the method 401 using an AI-model as may be created by the method 400. Additionally, in another embodiment, the method 401 may be executed continuously as a main loop (without a start or end point). Further, the steps of the method 401 may be executed in parallel, or simultaneously, by various systems (such as but not limited to the monitoring system 222, the RT analysis system 226, the confidence analysis system 230, the network optimizing system 234, the orchestration system 238) of the network management system 212.

As shown at operation 420, the monitoring system 222 may create and/or select and distribute the monitoring rules 248 to the network entities 218. In one embodiment, the monitoring rules 248 may be distributed based on a current network configuration. The monitoring system 222 may receive the current network configuration from the orchestration system 238. Further, the monitoring system 222 may continue to create and/or select and distribute the monitoring rules 248 to the network entities 218 as needed.

At operation 422, the network entities 218, using the monitoring rules 248, may generate and send the event log 220 to the monitoring system 222. The network entities 218 may generate and send the event log 220 continuously as needed.

At operation 424, the monitoring system 222 may collect the event log 220 from the network entities 218 and may create the log data 224 (which may be run-time log data). The monitoring system 222 may continue to create the log data 224 continuously.

At operation 426, the RT-Analysis system 226 may use the AI-Models of the RT-Analysis Rules 252 to analyze the log data 224 in real-time to detect the log-pattern/classifiers 304 and generate the respective data for the suspected one or more suspected situations 228. Operation 426 may also be executed continuously, as RT-Analysis system 226 may receive from the monitoring system 222 new log data 224, detect more log-pattern/classifiers 304, and generate more data for the one or more suspected situations 228. Each of the one or more suspected situations 228 may be associated with a respective confidence level, which may indicate a probability of occurrence of the respective network situation within a particular time period (such as the time period 306).

Additionally, at operation 428, the confidence analysis system 230 may analyze the suspected situations 228 and their respective confidence levels to determine and adapt the RT appropriate analysis strategy. For example, the confidence analysis system 230 may request the monitoring system 222 to create and/or select and distribute the monitoring rules 248 to the network entities 218 to increase the probability of detecting a log-pattern/classifiers 304, and/or to increase the confidence level of a respective suspected situation 228. In one embodiment, the confidence analysis system 230 may generate respective data of the predicted situations 232, such as where a respective confidence level reaches a predetermined threshold. The confidence analysis system 230 may process operation 428 continuously and/or repeatedly as the suspected situation 228 may be further received from the RT-Analysis system 226.

At operation 430, the network optimization system 234 may analyze the predicted situations 232 to determine a new network configuration 236. The network optimization system 234 may process the RT-Analysis system 226 continuously and/or repeatedly as the predicted situations 232 may be further received from the confidence analysis system 230.

Further, at operation 432, the orchestration system 238 may receive from the network optimization system 234 a new network configuration 236 and implement it (at operation 434) by modifying, migrating, installing and/or removing the network entities 218. The orchestration system 238 may process operation 432 continuously and/or repeatedly as the network configuration 236 is further received from the network optimization system 234. As a new network configuration is implemented, the monitoring system 222 may create and/or select and distribute the monitoring rules 248 to the respective network entities 218, and the RT analysis system 226 may select and/or use the respective AI-models included in the RT-Analysis Rules 252.

Additionally, the network optimizing system 234 may determine the network configuration 236 that the orchestration system 238 may then implement to avoid or exploit one or more of the predicted situations 232. Implementing a new network configuration 236 may result in a configuration change or a network reconfiguration. The network optimizing system 234 may determine which of the pending predicted situations 232 should be treated (e.g., avoided or exploited) in the subsequent configuration change.

In one embodiment, the network optimizing system 234 may determine a new network configuration 236 while the orchestration system 238 may still be implementing another (e.g., previously instructed) configuration change (of a previously implement network configuration 236). For example, the network optimizing system 234 may instruct parallel configuration changes affecting different parts of the communication network 202 and/or different network entities 218, and/or different services.

As such, the network optimizing system 234 may consider several parameters that may affect a decision associated with a reconfiguration of the network. Such parameters may include cost, priority, severity, confidence level, death expectancy of the pending predicted situation, life expectancy of a new configuration, collision with another reconfiguration currently processed by the orchestration system 238, etc. In the context of the present description, the term "minimal reconfiguration time" may refer to a minimal time required by an orchestration system (such as orchestration system 238) to migrate one or more network entities (such as network entities 218). In one embodiment, minimal reconfiguration time may be associated with a particular service and/or SLA, and, more particularly but not exclusively, with a particular network situation associated with the service and/or SLA.

In one embodiment, a configuration change (such as implemented via the network optimizing system 234 or the orchestration system 238) may be tagged, identified, and/or associated with one or more particular causes and effects and/or result (such as a particular load-change, requirement, fault, cyber-attack, etc.). For example, the network optimizing system 234 and/or orchestration system 238 may tag and/or associate a configuration change with one or more of the causes for a particular configuration change. Additionally, each tag or association may be assigned a weighting factor representing the effect of a particular cause on determining the particular configuration change.

Further, configuration settings may be stored as a data record or a data field in a file or a database (such as a database associated with network optimizing system 234). The data field or data record may include a start and stop time of the respective configuration, and the format of the data field or data record may enable a software package to identify the differences between two (or more) configurations represented by their respective data field or data record.

In the context of the present description, the term "difference measure" may refer to a value representing a difference between two (or more) configurations. Additionally, the term "dislocation" may refer to an entity located in a configuration which differs from the location noted in a reference configuration. A dislocation may refer to a missing entity, an added entity, and/or an entity located in a different place. Such entity may be any hardware component and/or a software component, such as a VNF instance, and/or a service, such as a micro-service.

In various embodiments, training and/or testing data may be derived from the same data-set (including log data). Additionally, the training data may be used to train the AI-engine to produce a rule-base, and the testing data may be used to evaluate the effectiveness of the developed rule-base.

The network optimization system 234 may determine the network configuration 236 which the orchestration system 238 may then implement to avoid or exploit one or more predicted situations. In one particular situation, implementing a new network configuration may result in a configuration change or a network reconfiguration. As such, the network optimization system 234 may determine which of the pending predicted situations should be treated (e.g., avoided or exploited) during the next configuration change.

Additionally, the network optimization system 234 may determine a new network configuration while orchestration system 238 may still be implementing another (e.g., previously instructed) network configuration 236. For example, network optimization system 234 may instruct parallel configuration changes affecting different parts of communication network 202, network entities 218, and/or different services.

In one embodiment, the network optimization system 234 may consider a variety of parameters which may affect a reconfiguration decision, including but not limited to, cost, priority, severity, confidence level, death expectancy of the pending predicted situation, life expectancy of the new configuration, collision with another reconfiguration currently processed by the orchestration system 238, etc. These parameters may also be considered in the context of processing the reconfiguration decision points 264 by the network optimizing system 234.

Additionally, it is to be appreciated that a configuration or reconfiguration change may directly affect cost. For example, a configuration change may involve migration of a software entity from one hardware entity to another. Such a migration may be executed in the form of "make before break", so as not to disrupt or adversely affect any service. This operation may mean that software entity B is installed, operated and updated in hardware entity B before software entity A is removed from hardware entity A. Therefore, software entity A and software entity B may be operative in parallel, and may each be implemented on a specific hardware entity, thereby increasing cost, including hardware, electricity, maintenance (including dissipating heat from hardware) costs, as well as third party costs including processing, storage, communication, licensing, etc. Furthermore, any additional costs (including extra hardware entities, etc.) may obviously affect the ability to generate income using the particular hardware entity.

Additionally, a configuration or reconfiguration change may be subject to priorities (such as due to limited resources). For example, migrating a first software entity from hardware entity A to hardware entity B may adversely affect the ability to migrate a second software entity to hardware entity A or to hardware entity B, as well as to any other hardware entity depending on a communication facility and/or hardware entity involved in the migration of the first software entity.

In one embodiment, the network optimization system 234 may use at least two sets of rules including configuration rules (which may determine how to resolve one or more predicted situations by an optimal reconfiguration) and reconfiguration decision points 264 (which may additionally determine when to resolve pending predicted situations).

In one embodiment, based on the processing of the reconfiguration decision points 264, the network optimization system 234 may determine which of the pending predicted situations to process for the next network configuration and when to process such pending predicted situations. For example, the network optimization system 234 may determine based on a reconfiguration condition point (of the reconfiguration decision points 264), whether to effect a reconfiguration immediately, or to delay a reconfiguration based on, for example, a combination of long death expectancy and low confidence level. In one embodiment, a reconfiguration may be delayed until a confidence level increases.

Additionally, the deep system module 216 may include processes (e.g., modules, systems) that may create and modify run-time rules. In one embodiment, the deep system module 216 may be construed as a-reverse analysis channel as it may use the output of the run-time module 214 to manage run-time rules. In other words, the deep system module 216 analyzes the behavior of the run-time module 214 so as to improve it by optimizing the rules controlling the behavior of the run-time module 214, such as adaptive pattern recovery and/or behavioral patterns.

Figure 5:
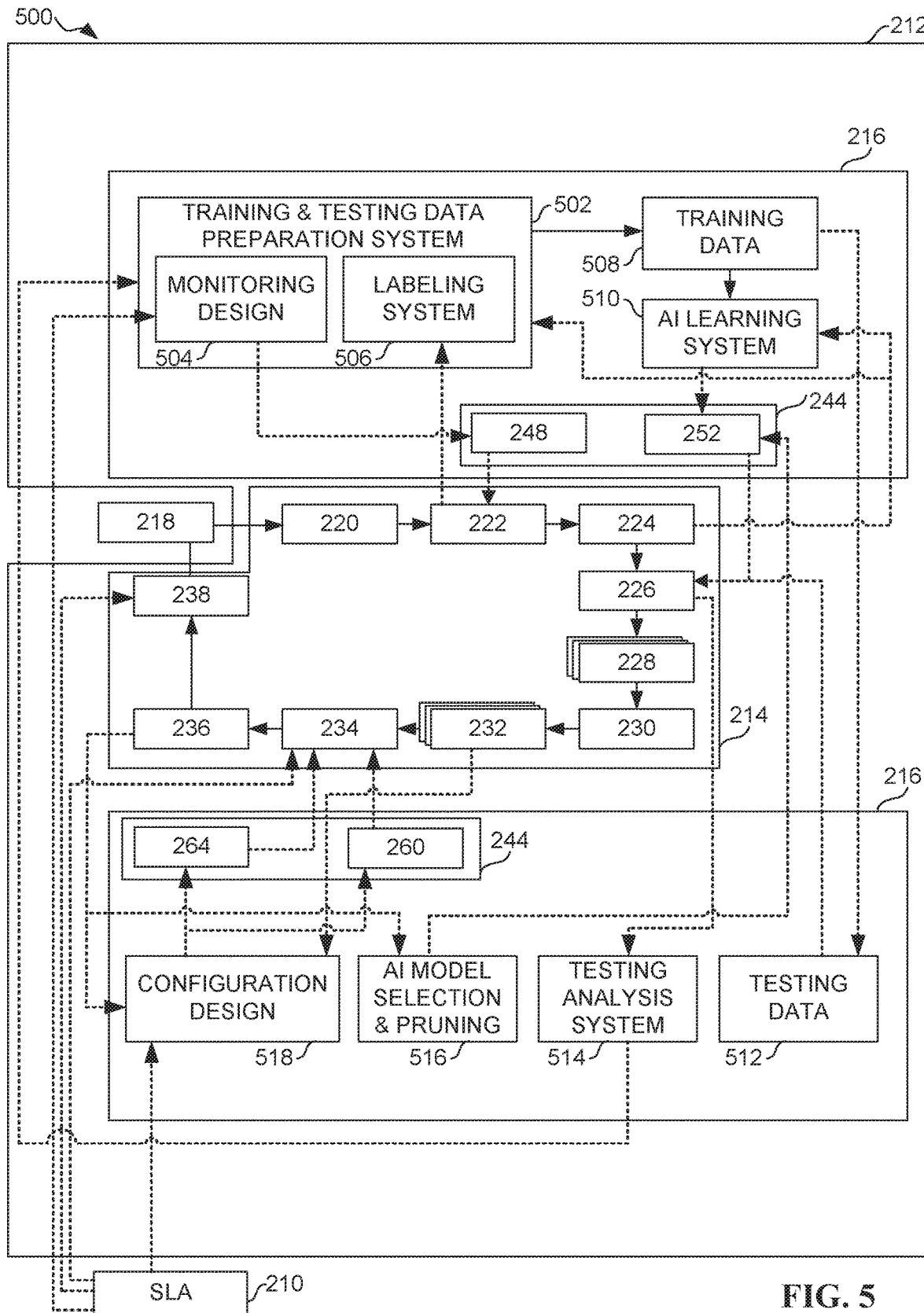
FIG. 5 illustrates a network management system, in accordance with one embodiment.

FIG. 5 illustrates a network management system 500, in accordance with one embodiment. As an option, the network management system 500 may be implemented in the context of any one or more of the embodiments set forth in any previous and/or subsequent figure(s) and/or description thereof. Of course, however, the network management system 500 may be implemented in the context of any desired environment. Further, the aforementioned definitions may equally apply to the description below.

As shown, an AI learning system 510 which may produce the RT-analysis rules 252 (or the AI-models, or predictors). The AI learning system 510 may analyze training data and/or testing data that is created from the log data 224 to produce RT-analysis rules 252. Additionally, the AI learning system 510 may receive as input the log data 224.

Additionally, the training and testing data preparation system 502 may include a monitoring design module 504 and a labeling system 506. Labeling system 506 may convert log data (such as the log data 224) into training-data and testing-data for the AI learning system 510. The labeling system 506 may label training-data and testing-data. In one embodiment, the labeling system 506 may determine where to properly mark network situations in the training-data and/or testing-data. In one embodiment, the labeling system 506 may receive as input the log data 224 from the monitoring system 222. In one embodiment, the log data inputted to the labeling system 506 may be separate from the log data 224. For example, in one embodiment, the monitoring system 222 may provide separate log data to the labeling system 506. The output of the labeling system 506 includes training data and testing data (based on log data with labels of network situations). The output of the monitoring design module 504 includes monitoring rules adapted to particular network situations.

In one embodiment, the monitoring design module 504 may create and distribute monitoring rules to one or more relevant network entities such that that network situations and their respective classifiers can be detected. Additionally, a network situation may depend on a network configuration and/or the monitoring rules (such as the monitoring rules 248) which may depend on the network situations and/the network configuration.

Additionally, the monitoring design module 504 may optimize monitoring rules to improve the log data collected and provided to the training and testing data preparation system 502 such that predicted situations can be predicted more accurately and/or earlier, and to enable detection of more or new predicted situations. The output of the training and testing data preparation system 502 may be provided as training data 508, which in turn, may be sent to the AI learning system 510.

As shown, the configuration design system 518 may optimize configuration rules (such as configuration rules 260 and/or reconfiguration decision points 264) to improve the results of the network configuration system. To that end, the configuration design system 518 may receive inputs from the run-time module, including the network configuration 236 and/or one or more predicted situations 232, as well other network parameters, including SLAs 210. Additionally, the configuration design system 518 may measure the quality of the computed network configuration, including a cost of a reconfiguration, time required to reconfigure the network, a length of time the configuration has lasted, etc. In one embodiment, the configuration design system 518 may include goals for the network reconfiguration.

Additionally, an AI model selection & pruning 516 system may receive the network configuration 236 and based on such, may select and prune network configurations, resulting in RT-analysis rules 252. Further, testing analysis system 514, may receive an output from the RT analysis system, and may provide such data as input to the training and testing data preparation system 502.

Figure 6:
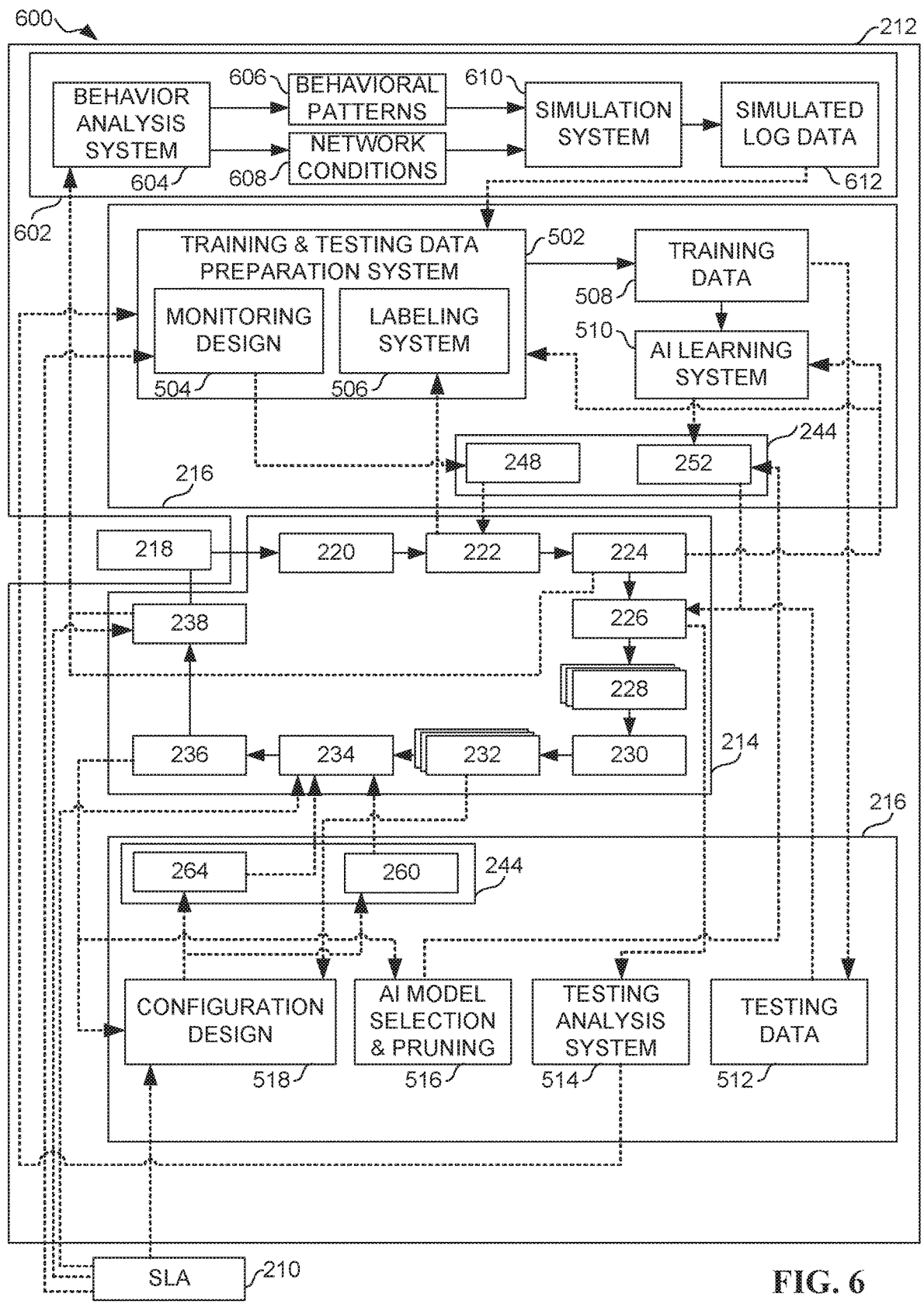
FIG. 6 illustrates a network management system, in accordance with one embodiment.

FIG. 6 illustrates a network management system 600, in accordance with one embodiment. As an option, the network management system 600 may be implemented in the context of any one or more of the embodiments set forth in any previous and/or subsequent figure(s) and/or description thereof. Of course, however, the network management system 600 may be implemented in the context of any desired environment. Further, the aforementioned definitions may equally apply to the description below.

As shown, the network management system 600 builds upon the network management system 500. In one embodiment, the network management system 600 may be used to simulate network behavior when there is no sufficient amount of log data (which may result from network dynamics, including new network configurations). In such a situation, log data may be simulated or synthesized. In particular, simulating log data may include analyze the network behavior to produce primitives that may then be used as components from which training data is composed/synthesized/simulated.

A higher level of the deep system module 216 of the network management system 212 may include processes (e.g., modules, systems) that simulate a network behavior when there is not enough log data (such as the log data 224). Insufficient log data may result from network dynamics. As demand changes and shifts more rapidly and more frequently, particular network configurations may not produce sufficient log data. Additionally, network configurations may be new (thereby having no history of log data). As such, there may be a need to simulate (or synthesize) log data. The simulation level (corresponding with the simulation module 602) may include a collection of mechanisms that analyze the network behavior to produce "primitives". The primitives in turn may be used as a simulation of training-data and testing-data for a new configuration.

In one embodiment, the simulation module 602 may include a behavior analysis system 604, which may produce several primitives, including behavioral patterns 606 and network conditions 608. In one embodiment, the behavioral patterns may include sequences of event-log data (such as log data 224) produced by a network entity (of the network entities 218), or a particular virtual network function (or a similar entity), that are characteristic of a particular arrangement such as a timing to serve a particular service to a particular customer.

At simulation system 610, log data may be simulated or synthesized for a particular configuration, including arranging, interlinking, and interleaving, behavioral patterns. As such, the behavioral patterns 606 should be properly detected, defined, and characterized, such that they can be properly selected and combined in the process of simulating, or synthesizing, log data as shown in simulated log data 612.

Additionally, network conditions 608 include situations that may be predicted by the RT analysis system 226. Additionally, the network conditions 608 may serve as labels for labeling (via the labeling system 506 of the training & testing data preparation system 502) the training data 508 (or testing data) for the AI learning System 510. As such, the network conditions 608 should be properly detected, defined, and characterized, such that they can be automatically detected and properly labeled in old and new simulated (synthesized) log data, as shown in simulated log data 612. For example, a network condition (of the network conditions 608) may be characterized by one or more network parameter(s), and/or by a condition of one or more of particular type(s), including a network fault, a service fault, an SLA fault, a cyber-attack, a security breach, a cost-reduction opportunity, etc.

Figure 7:
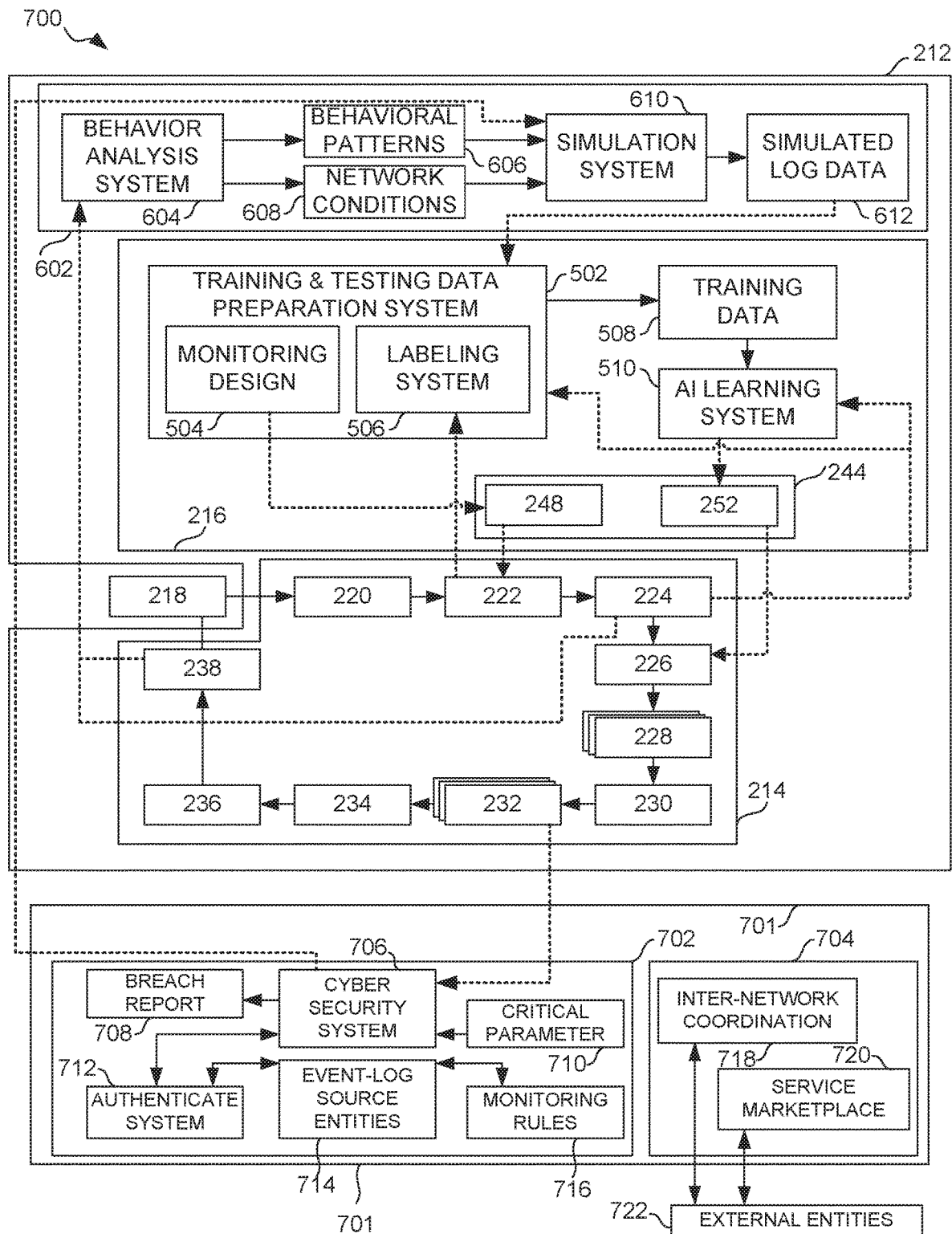
FIG. 7 illustrates a system, in accordance with one embodiment.

FIG. 7 illustrates a system 700, in accordance with one embodiment. As an option, the system 700 may be implemented in the context of any one or more of the embodiments set forth in any previous and/or subsequent figure(s) and/or description thereof. Of course, however, the system 700 may be implemented in the context of any desired environment. Further, the aforementioned definitions may equally apply to the description below.

As shown, a security module 702 and a coordination module 704 may relate to an exogenic level 701. The exogenic level 701 may be separate from the network management system 212, the run-time module 214, and/or the deep system module 216. In one embodiment, the exogenic level 701 may include any aspect foreign to the network management system 212, including but not be limited to interaction with the outside world, other networks, other network management systems, cyber-attacks, and/or any other phenomena that is not intended as internal to the network management system 212.

The system 700 may relate to systems and functions that interact with the environment of the communication network 202. For example, coordination module 704 may include inter-network coordination 718 and service marketplace 720. In one embodiment, inter-network coordination may include coordinating load and configuration matters with neighboring networks, automatically negotiating with other networks and customers, mitigating cyber attacks, etc. Additionally, the inter-network coordination 718 and the service marketplace 720 may communicate with one or more external entities 722. For example, the external entities may include other networks, and/or network systems of customers.

The coordination module 704 therefore may involve computation(s) that depend on the current configuration of the network. In this manner, the coordination module 704 may relate to rules that apply to the current configurations, including current monitoring rules 248, current RT-analysis rules 252, current confidence analysis rules 256, current configuration rules 260, orchestration rules 266, current behavioral patterns 606, etc.

Any such rules of any layer/module/component of the network management system 212 may be exchanged with any external party (such as another network operator, a service provider, and/or a consumer), and/or transmitted to or received from any external party. Additionally, when negotiating network information with a third party (or third parties) any rule may be encrypted and embedded in the negotiation information. In one embodiment, the negotiation information may include the configuration and associated rules that apply to the network condition.

As shown, security module 702 may include a cyber security system 706 which may receive input from critical parameter 710, authenticate system 712, and one or more predicted situations 232. The security module 702 additionally includes an event-log source entities 714 which may be in communication with the monitoring rules 716. In one embodiment, the monitoring rules 716 may include monitoring rules 248. Further, the security module 702 may include a breach report 708 that receives an output from the cyber security system 706. The cyber security system may additionally provide output to the simulation system 610.

In various embodiments, although not shown in FIG. 7, the system 700 may also interact with various components of the network management system 500 and/or the network management system 600. For example, the inter-network coordination may interface with the behavior analysis system 604 and/or the configuration design system 518. In like manner, the service marketplace 720 may interface with the behavior analysis system 604 and/or the configuration design system 518.

Additionally, although the systems which control the network optimizing system 234 are not shown in FIG. 7, it is to be understood that such control systems/aspects are specifically shown in FIG. 5 and/or FIG. 6. Additionally, the training data 508 in FIG. 7 is not shown with an output, as the testing data 512 system is specifically not shown (but which is detailed in relation to FIG. 5 and/or FIG. 6). It is to be appreciated that any omissions of flow of instructions and/or data in FIG. 7 may be supplemented through FIG. 5 and/or FIG. 6. To simplify FIG. 7, aspects of FIG. 5 and/or FIG. 6 were omitted in FIG. 7 to more clearly show the system 700.

Further, data exchanged between systems and/or processes (such as exemplified in FIG. 7 and other figure) may be communicated indirectly, such as by memory, storage, data sharing facility, and/or a database system. A database system may be included within any of the modules, such as any other component of the network management system 212. Further, the database system may include network configuration records, network situations associated with their respective network configurations, network situations associated with their respect minimum configuration time values, monitoring rules associated with network situations to which each monitoring rule is applicable, AI-models associated with their respective network situations, confidence levels and/or time periods associated with their respective AI-models and/or network situations, etc.

Figure 8:
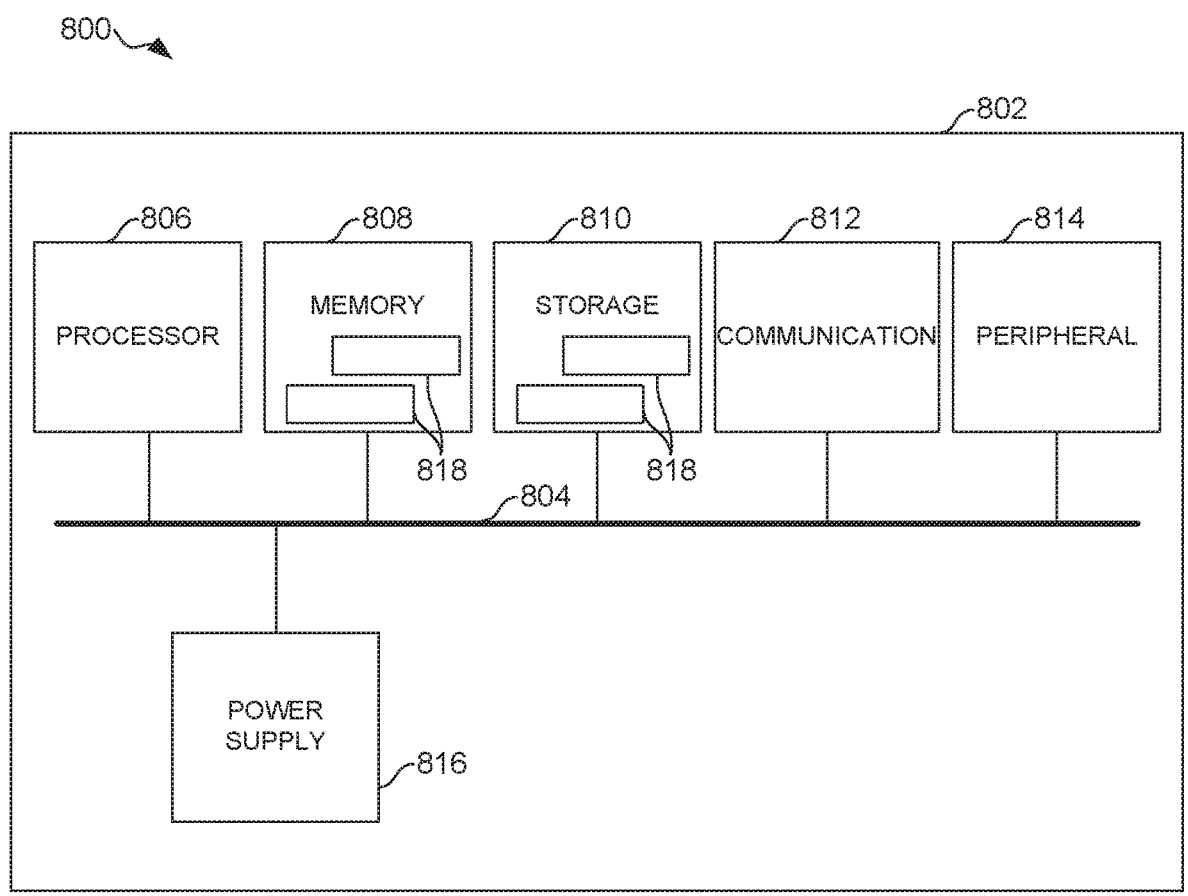
FIG. 8 illustrates a block diagram, in accordance with one embodiment.

FIG. 8 illustrates a block diagram 800, in accordance with one embodiment. As an option, the block diagram 800 may be implemented in the context of any one or more of the embodiments set forth in any previous and/or subsequent figure(s) and/or description thereof. Of course, however, the block diagram 800 may be implemented in the context of any desired environment. Further, the aforementioned definitions may equally apply to the description below.

As shown, block diagram 800 includes a computational device 802 which may be used for a network entity (such as network entities 218) and/or any computing element such as the network management system 212, the deep system module 216, etc., according to one exemplary embodiment. Additionally, the computational device 802 may include at least one processor unit 806, one or more memory units 808 (e.g., random access memory (RAM), a non-volatile memory such as a Flash memory, etc.), one or more storage units 810 (e.g. including a hard disk drive and/or a removable storage drive, representing a floppy disk drive, a magnetic tape drive, a compact disk drive, a flash memory device, etc.), one or more communication units 812, and/or one or more peripheral units 814 (or peripheral control units). The communication unit 812 may use any type of communication technology. Additionally, the computational device 802 may also include one or more communication buses 804 connecting any of the units of the computational device 802.

Further, the computational device 802 may also include one or more power supply units 816 providing power to any of the units of the computational device 802.

The computational device 802 may also include one or more computer programs 818, or computer control logic algorithms, which may be stored in any of the memory units 808 and/or storage units 810. Such computer programs, when executed, may enable the computational device 802 to perform various functions. Additionally, the memory units 808 and/or storage units 810 and/or any other storage may be a tangible computer-readable media.

Figure 9:
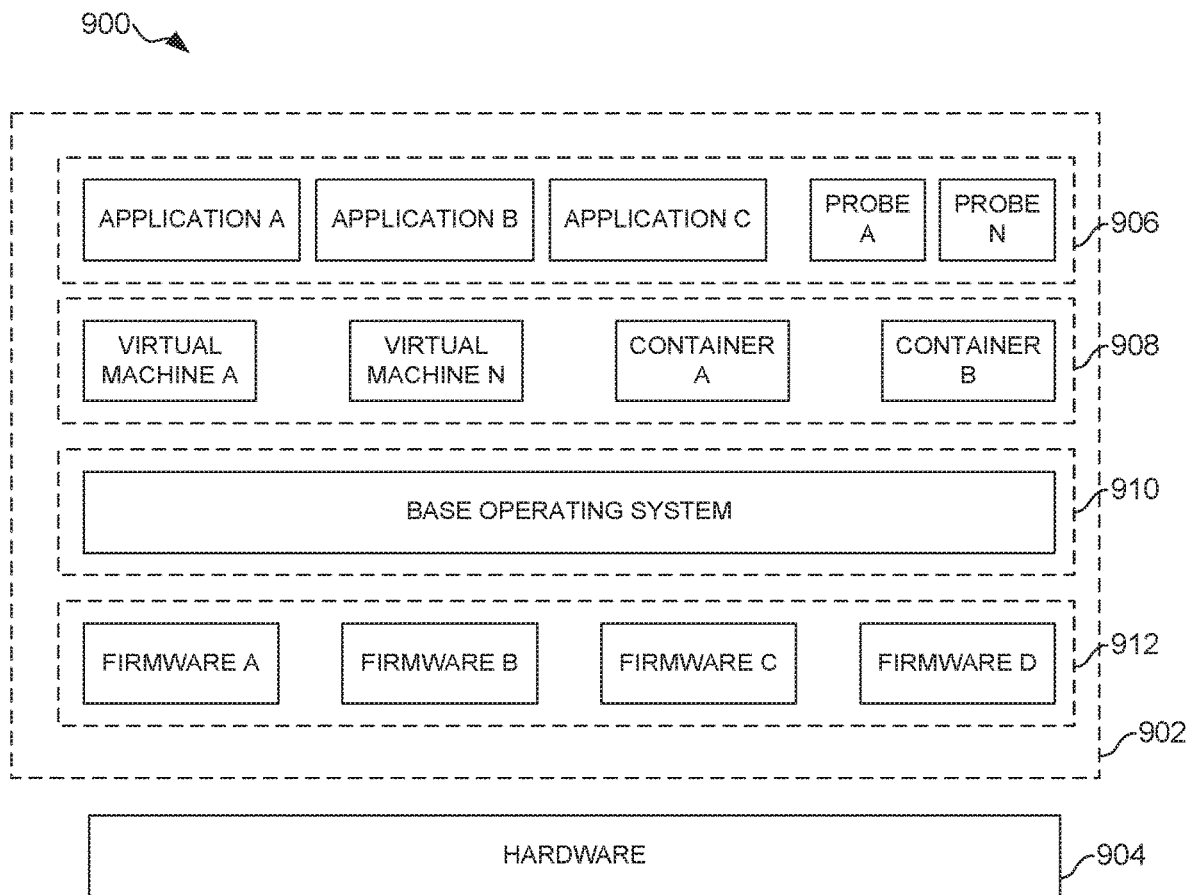
FIG. 9 illustrates a block diagram of software programs, in accordance with one embodiment.

FIG. 9 illustrates a block diagram 900 of a software programs, in accordance with one embodiment. As an option, the block diagram 900 may be implemented in the context of any one or more of the embodiments set forth in any previous and/or subsequent figure(s) and/or description thereof. Of course, however, the block diagram 900 may be implemented in the context of any desired environment. Further, the aforementioned definitions may equally apply to the description below.

In one embodiment, the block diagram 900 may be used by the computational device 802 such as part of the one or more computer programs 818 according to one exemplary embodiment. Additionally, computer programs 818 may operate over hardware 904, which may include hardware components as shown and described with reference to FIG. 8.

The computer programs 902 may include a first level of one or more firmware 912 software programs. The one or more firmware 912 may provide control of one or more hardware components (such as the storage unit 810, communication unit 812, and/or a peripheral unit 814). The computational device 802 may also include a second level of a base operating system 910. The base operating system 910 may provide control of memory units 808 and the hardware 904, typically via firmware 912, as well as communication and coordination between other components.

Additionally, the computer programs 902 may also include a third level 908 of a one or more virtual machines and/or containers. Each virtual machine may include one or more subordinate operating systems, as well as a library of functions. Each container may include subordinate operating systems as well as a library of functions.

The computer programs 902 may also include a fourth level 906 of one or more application software programs and/or probes. An application software program may be any of the software systems as herein described.

In one embodiment, a probe may include a software program that monitors and/or measures (and reports to a monitoring system such as the monitoring system 222) one or more operational parameters of any of the lower levels (such as the third level 908, the base operating system 910, and/or the firmware 912 of a first level), the hardware 904, and/or operating parameters of one or more applications. For example, an application or a probe may be executed over the base operating system 910 directly, over a virtual machine (typically executing a subordinate operating system), or embedded within a container (typically also embedding a subordinate operating system).

In various embodiments, the communication network and network management system of FIG. 2A may orchestrate (and/or manage, control) any component of any level of the computational device 802. Additionally, any component of any level of the computational device 802 may measure one or more operational parameters and report such within the event log 220, typically according to a monitoring rule (such as the monitoring rules 248), to the monitoring system 222. Further, the operations associated with network configuration, configuration change, reconfiguration, and/or migration, may refer to any software component of any level shown of the block diagram 900.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

In this respect, the SLA 210 or any similar descriptions of wanted and/or unwanted network behavior (e.g., cost saving, service fault, cyber-security attack/breech, etc.) may be used to define a corresponding one or more parametrized network situations. A network situation 1022 may be parametrized in the sense that it can be detected when the value of one or more operational parameters of the network reaches a particular threshold, etc.

The monitoring rules 248 may be devised and implemented in sufficient network entities 218 to report the pertinent parameters identifying the respective network situation. The network situation may be detected in the log data 224 of the communication network and properly labeled. The AI-learning system 510 may be used to detect a classifier (such as a log-pattern, or a pattern of event parameters reported by various network entities 218, where the log-pattern predicts a following network situation). In one embodiment, the AI-learning system 510 may operate in two steps where an unsupervised AI learning may search for a classifier and the AI-learning system 510 may then create an AI-model 244 to automatically detect a particular single classifier instance.

In a first step, an unsupervised AI learning may search for a classifier, such as a correlated repetition of patterns in the log data 224 preceding the network situation within a particular time range, wherein the time range may be statistically significant. Additionally, this may include a statistical process where the AI-learning system 510 may investigate a large number of instances of a particular type of network situation (as labeled) to identify a repetitive pattern of the log data 224 (which may be found immediately preceding the network situation within a particular time range), which may be identified as lead-time. It should be noted that there may be any number of different patterns of the log data 224 preceding a network situation type. In this sense, 'immediately' may mean within a predefined time range.

In a second step, the AI-learning system 510 may create an AI-model (such as the run-time rules and/or AI models 244) to automatically detect a particular single classifier instance wherein the classifier (or the associated network situation) may have a confidence level representing the probability that the detected classifier will indeed mature into a network situation within a time range about the lead-time.

It should be further noted that these two steps may be implemented as a single procedure performing these two steps as a combined iterative process of detecting the classifier and creating the AI-model.

In one embodiment, the product of the AI-learning system 510 may be an AI model that detects a particular classifier. Further, the classifier may be a pattern of data elements, and the AI-model is a piece of software (e.g., a neural network) that detects the particular pattern in a stream of log data, so that, although the classifier and the AI-model may be different, they may also be closely related. Thus, parameters associated with the classifier may be associated with the AI-model and vice versa.

In one embodiment, the classifier, and hence the respective AI-model, may include such parameters as the time of the classifier, an identification of a particular type of network situation that may follow the classifier, a lead-time, and possibly a time range, a confidence level, and parameter characterization. In the context of the present description, the term confidence level may refer to the probability that the identified network situation will mature within a predetermined time range. In one embodiment, the predetermined time range may be at the end of the lead-time following the time of the classifier. Other parameters may include parameters associated with a group of classifiers and/or AI-models, such as a resolution stage (level) and minimum reconfiguration time, which may be associated with the network situation, etc.

Although the classifier itself may be unknown, the AI-learning system 510 may provide some data about the classifier, such as the parameters that the AI-model may process to detect an identifier. Additionally, these parameters may form a parameter characterization data and, thus, the parameter characterization data of a particular AI-model may identify each such parameter by type, as well as the particular network entities reporting the particular parameter.

In one embodiment, while the AI-learning system 510 may scan for a lower resolution classifier, the AI-learning system 510 may be requested to look for a classifier with a lead-time longer than any higher resolution classifier. In another embodiment, while the AI-learning system 510 scans for a higher resolution classifier, the learning system may be requested to look for a classifier with higher confidence level than any lower resolution classifier. Therefore, the AI-learning system 510 may produce a multi-stage structure of AI-models with increasing resolution, increasing confidence level, and decreasing lead-time (and vice versa).

Figure 10:
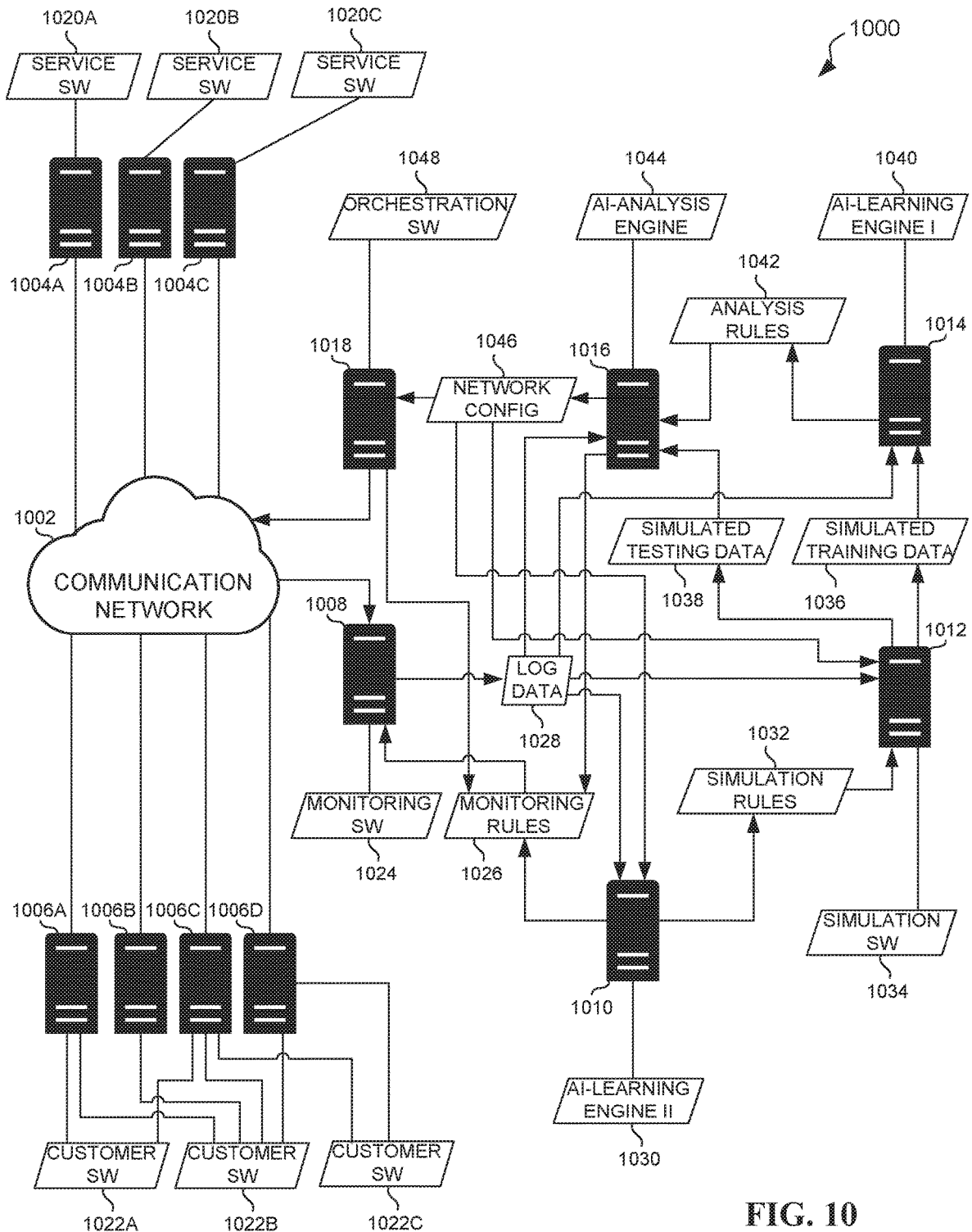
FIG. 10 illustrates a communication network system, in accordance with one embodiment.

FIG. 10 illustrates a communication network system 1000, in accordance with one embodiment. As an option, the communication network system 1000 may be implemented in the context of any one or more of the embodiments set forth in any previous and/or subsequent figure(s) and/or description thereof. Of course, however, the communication network system 1000 may be implemented in the context of any desired environment. Further, the aforementioned definitions may equally apply to the description below.

In operation, a customer's computing device 1006A, 1006B, 1006C, and/or 1006D may execute any number of the customer's software packages 1022A, 1022B, and/or 1022C. In one embodiment, a service computing device may execute any number of service software packages. Hence, as shown, the computing device 1006A is shown to execute customer software package 1022A and customer software package 1022B, whereas the computing device 1006B is shown to execute only customer software package 1022B. Alternatively, each of the computing device 1006A, 1006B, 1006C, and/or 1006D may be connected to each of the customer's software packages 1022A, 1022B, and/or 1022C.

In another embodiment, a service software package may be provided by the same customer, by a different customer, or by a third party using the customer's service computing devices 1004A, 1004B, and/or 1004C to provide software as a service (e.g., SaaS) 1020A, 1020B, and/or 1020C. In yet another embodiment, the service computing device 1004A, 1004B, and/or 1004C may be operated by a customer, by a cloud operating entity, by a network operating entity such as being a part of the communication network system 1000, or by an edge computing operating entity.

In one embodiment, the communication network 1002 may include communication devices and computing devices providing processing, memory, storage, etc. In the context of the present description, a "network" may refer to any type of communication network, including analog and/or digital communication networks, wired and/or wireless communication networks, WAN, LAN, PAN, etc. Additionally, the network may include hardware and/or software. Additionally, some of the communication functions may be provided as software executed by computing devices, such as Virtual Network Functions (VNFs) of a Network Function Virtualization (NFV). In another embodiment, the operation of the communication network 1002, including the communication devices, the computing devices, the VNFs, etc. may be managed by an orchestration system (such as the orchestration system 238) executing orchestration software. In yet another environment, the operation of the communication network 1002, including the communication devices, the computing devices, the VNFs, etc. may be monitored by a monitoring system executing monitoring software and producing log data.

As shown, the communication network 1002 may allow for communication between any of the service computing device 1004A, 1004B, and/or 1004C, any of the customer's computing device 1006A, 1006B, 1006C, and/or 1006D, and the orchestration system 1018 and/or the monitoring system 1008.

In one embodiment, the orchestration system 1018 may deploy software packages (such as micro-services and/or VNFs) according to configuration data, and/or configuration-change data, provided by a network analysis and configuration system executing network analysis and configuration software. Such configuration change may shift processing load and/or communication load from a first device of the communication network system 1000 to another so as to balance the load and provide adequate service according to the ever-changing requirements of the network customers. In one embodiment, configuration data, and/or configuration-change data may be produced (directly by the confidence analysis system 230 or indirectly by the network optimizing system 234) by an AI-analysis system executing AI-analysis software (e.g., an AI-analysis engine) and the AI-analysis software may process analysis rules for analyzing the log data produced by the monitoring system.

In the context of the present description, a "load" may refer to any type of network characteristic and/or parameter such as bandwidth, latency, jitter, processing power, memory, storage, etc. Additionally, the load may include any particular requirement for such network characteristic, parameter, and/or service associated with such network characteristic and/or parameter. In the context of the present description, a "load-change" may refer to any change in load, and/or a change of a load requirement, and/or a change in the use, and/or consumption, of such network characteristic, and/or parameter, and/or associated service. In one embodiment, network parameters may include bandwidth, bit-rate, latency, jitter, processing power and/or processing time, memory, and/or storage.

In the context of the present description, a software element, software component, and/or software entity, may refer to any type of program software executable by, or stored in, any type of computation device including but not limited to processor, memory, storage, bus, communication adapter, and any type of computing peripheral including a computer, a server, a network node, a client device, etc. Particularly, a software element may be a micro-service, a VNF, etc. Additionally, in the context of the present description, a "current configuration" (including a current network configuration and/or topology), may refer to a network configuration and/or topology in use at the time of logging an event and/or at the time of executing a rule.

In the context of the present description, a "new configuration" may refer to a new network configuration and/or topology, and/or a resulting configuration change, proposed by the network management and/or orchestration system (such as the orchestration system 1018), and particularly by an AI-analysis system, which may be part of the network management and/or orchestration system.

In one embodiment, a service configuration may include a network configuration applicable for a particular service. Such service may be requested by and/or proposed to a particular customer (such as a requesting party), for particular time period, and/or locality, and/or business structure. The service configuration may therefore apply to a part of or an entirety of a communication network system 1000 or more than one networks.

In one embodiment, the analysis rules 1042 processed by the AI-analysis software may be provided by an AI-analysis engine 1044. Additionally, the AI-learning system may analyze log data of the network to create analysis rules. Further, the analysis rules may indicate or create an optimized network configuration and/or network configuration change and may also create and/or amend monitoring rules.

It should be noted that the communication network system 1000 may be used to overcome disadvantages of processing log data to produce analysis rules, for example, where a communication network may be required to work for a long time before the log data is sufficiently rich to produce effective analysis rules. Additionally, in one embodiment, where the configuration of the communication network system 1000 is changing continuously or repeatedly, there may be a situation where there is never sufficient relevant log data 1028 (i.e., the log data relevant to the current configuration is not enough to produce sufficiently effective analysis rules).

In one embodiment, the simulation system 1012, executing simulation software 1034, may generate simulated training data 1036 for the AI-analysis engine 1044, augmenting the lack of sufficient log data 1028. The simulation system may generate simulated training data upon the AI-analysis system creating a new network configuration 1046, even before this new network configuration is deployed and/or implemented by the orchestration system 1018. Therefore, the AI-learning engine I system 1014 may generate new analysis rules 1042, based on the simulated training data, where these new analysis rules are adapted to the new network configuration, optionally before this new network configuration is deployed and/or implemented. It should be understood that the AI-learning engine I system 1014 may execute the AI-learning engine I 1040 (these two names may be used interchangeably), that the AI-analysis engine system 1016 may execute the AI-analysis engine 1044 (these two names may be used interchangeably), that the orchestration system 1018 may execute the orchestration software 1048 (these two names may be used interchangeably), that the simulation system 1012 may execute the simulation software 1034 (these two names may be used interchangeably), that the AI-learning engine II system 1010 may execute the AI-learning engine II 1030 (these two names may be used interchangeably), and that the monitoring system 1008 may execute the monitoring software 1024 (these two names may be used interchangeably). Further, the AI-analysis engine system 1016 may in turn then analyze the new network configuration with simulated testing data provided by the simulation system before this new network configuration is deployed and/or implemented.

In one embodiment, the simulation system may produce (using simulated training data 1036 and testing data 1038 based on simulation rules) a network configuration provided by the AI-analysis system, as well as log data 1028. In a further embodiment, the simulation rules 1032 may use the log data 1028 obtained for particular communication device, processing device, and/or software packages (micro-services, VNFs, etc.) which provide particular services to particular customers and adapt this data to the new network configuration thus simulating the behavior of the network under many combinations of load situations.

In one embodiment, another AI-learning system may analyze the log data 1028 of various network configurations and load situation to produce simulation rules for use by the simulation system 1012. Additionally, generating simulation rules 1032 may be repetitive or continuous as more log data 1028 is collected for more network configurations, for more services, customers, and load situations. It should be noted that this AI-learning system may also produce monitoring rules 1026 to provide more log data 1028 for producing more accurate simulation rules 1032.

In one embodiment, the AI-analysis engine may be used to detect classifiers. In the context of the present description, a "classifier" may refer to any type of temporal pattern of events in the log data that eventually leads to a fault situation which requires a new network configuration and/or a network configuration change. In one embodiment, classifiers may be detected by an AI-analysis engine 1044 based on the log data 1028 and the simulated log data and may include a temporal pattern of network events in the log data 1028 or in the simulated log data which leads to a network fault. In one embodiment, the network fault may require a new configuration of the communication network system 1000.

In the context of the present description, an event in the log data may refer to any record of change in the operation of any type and/or instance of a hardware entity and/or a software entity such as a processing device (including a server, processor, memory, storage, and/or peripheral), a communication device (e.g., a cable, a router, and/or a node), an operating system, OS virtualization software, a micro-service, and/or a VNF. In one embodiment, a change in operation may refer to a load-change, such as a change in availability of processing power, memory, storage, and/or communication bandwidth, or a load-change affecting processing latency, storage latency, communication latency, jitter, and/or bandwidth. An event may also include situations such as any type of hardware fault, cyber-attack, security breech, alarm, alert, deterioration of the level of any aspect of any particular service, etc. Further, the event may include a decrease in consumption of any resource (which may lead to shutting down a resource). In the context of the present description, a "fault event" refers to a situation requiring a new network configuration and/or a network configuration change to overcome the fault and recover the required quality of service.

In one embodiment, a network configuration change may lead to migration of processing and/or communication functions or entities, which may be implemented in software, or between processing and communication resources, which may be implemented in hardware. It should be noted that such a configuration change may improve a service level or a parameter associated with the quality of a service provided to a particular customer, or shutting down a resource to reduce cost. In another embodiment, a network configuration change may result from an accumulation of various events that affect consumption and/or load-change, and such events may be unrelated to one another.

In another embodiment, the AI-analysis engine may be used to detect such development of a load-change and/or consumption situation early enough to determine and effect the network configuration change before any service is adversely affected. It should be noted that such a sequence and/or cluster of events may be a classifier which may predict an event with a particular confidence, where the predicted event may directly cause a network configuration change.

In one embodiment, the AI-learning engine I 1040 may create analysis rules 1042 for the AI-analysis engine 1044 to detect such classifiers and/or assign each classifier a weighting factor delineating, for example, the level of confidence of the predicted event. Additionally, the AI-learning engine I 1040 may generate the analysis rules 1042 based on training data and/or testing data derived from the log data 1028 provided by the monitoring system 1008, and/or from simulated training data 1036 and simulated testing data 1038 generated by the simulation system 1012. It should be noted that although the simulated testing data 1038 is shown in the communication network system 1000 to lead to AI-analysis engine system 1016, it may also lead to AI-learning engine I system 1014.

Further, simulated training data can be made available to the AI-learning engine I 1040 before the monitoring system 1008 produces a sufficient (above a predetermined threshold) amount of log data to generate actual training data. In one embodiment, a weighting factor may be applied to any of the first network events, the second network events, and the third network events and the weighting factor may increase as the amount of time between a particular network event and an implementation of the first configuration increases.

In one embodiment, the analysis rules 1042 used by the AI-learning engine I 1040 to analyze log data and propose a new network configuration and/or a network configuration change may be pertinent to a particular current network configuration for which the log data 1028 applies.

In one embodiment, different types of hardware and software components may be assigned different weighting factors and the difference measure may be a weighted sum of the dislocations. In the context of the present description, a "difference measure" may refer to a value representing a difference between two or more configurations. Additionally, in the context of the present description, a "dislocation" may refer to an entity located in a particular configuration not in the same place as in the core configuration. Additionally, dislocation may include a missing entity, an added entity, and/or an entity located in a different place, and such an entity may be any hardware component, a software component such as a VNF instance, and/or a service such as a micro-service.

In one embodiment, a value range of difference measure between multiple configurations may include a number of entities that are not located in the same place as in the core configuration. In another embodiment, weighting factors may be determined according to the use and/or consumption of the dislocated component. It should be noted that such use and/or consumption may involve the amount (represented as an average value, cumulative value, and/or maximum value) of consumption of a particular characteristic such as traffic, bandwidth, processing, memory, and/or storage.

Additionally, in another embodiment, other mechanisms for calculating weights, difference measure, a configuration spectrum, and/or a relevant data-set, may also be contemplated. For example, a weighting factor may be associated with rules, where the weighting factor may represent a difference measure between the current configuration and the configuration associated with the rule. It should be noted that, if a rule is associated with several configurations, the difference measure may reflect the best (smallest) difference measure or an average value.

In one embodiment, the AI-analysis engine may use the analysis rules 1042 generated by the AI-learning engine I 1040. In one embodiment, the analysis rules 1042 may be used to detect classifiers in the current log data 1028. It should be noted that effective detection may include detecting a classifier early enough (with time to take action), and with minimum or no false detection such as a false negative (i.e., not detecting a classifier in time) or false positive (i.e., determining a wrong or non-existent classifier).

Additionally, the AI-learning engine I 1040 may require a large amount (over a predetermined threshold) of the log data 1028 to generate effective analysis rules 1042 for each network configuration. In instances where an insufficient amount of the log data 1028 exists, the training simulation system may generate simulated log data, as well as simulated training-data 1036 and simulated testing-data 1038, for AI-learning engine I 1040. It should be noted that although the simulated testing data 1038 is shown in the communication network system 1000 to lead to AI-analysis engine system 1016, it may also lead to AI-learning engine I system 1014.

In one embodiment, the training simulation system may generate simulated log data based on the log data 1028, such as event records, generated for other configurations. It should be noted that the training simulation process may assume that the hardware entities of the new configurations are the same as in prior network configurations, and that the software entities of the new configurations are the same as in prior network configurations. Additionally, the training simulation process may further assume that a difference between the new configuration and prior network configurations is in the distribution of software entities over hardware entities and resulting communication paths. In one embodiment, each hardware entity of the new configuration may host different numbers and types of software entities. Further, software entities used in an older configuration may be located in a different hardware entity in the new configuration. Thus, communication patterns may differ between new network configurations and prior network configurations.

In another embodiment, the training simulation system may generate log-events, which are typical for each particular hardware and/or software entity used in the new network configuration. Additionally, the training simulation system generates such log-events in a pattern that is typical of the particular hardware and/or software entity, thus emulating development of a particular phenomenon such as a hardware failure, a software failure, or a service consumption pattern. It should be noted that there may be several such development patterns.

In yet another embodiment, the simulation system 1012 may accumulate the emulated log-events into a simulated log data of the new network configuration. Additionally, the simulation system 1012 may also analyze the log data 1028 to determine fault situations adversely effecting a service, and optionally generate fault events. Further, the simulation system 1012 may also create simulated training data 1036 and simulated testing data 1038 from the simulated log data and deliver the simulated training data and simulated testing data to AI-learning engine I system 1014 and/or the AI-analysis engine system 1016. It should be noted that although the simulated testing data 1038 is shown in the communication network system 1000 to lead to AI-analysis engine system 1016, it may also lead to AI-learning engine I system 1014.

In still another embodiment, the AI-learning engine I 1040 may analyze the simulated training data 1036 and the simulated testing data 1038 to determine temporal patterns of events in the log data that eventually lead to fault situations (including fault events), determine effective classifiers as verified by the simulated testing data, and create network analysis rules adapted to the new configuration to which the simulated training data and the simulated testing data applies. Thereafter, the network analysis rules are delivered to the AI-analysis engine, which uses the rules to analyze the current log data collected by the monitoring system for the new network configuration.

In one embodiment, the AI-learning engine II 1030 may analyze the log data 1028 per the effective network configuration to determine whether the classifiers determined by the AI-learning engine I 1040 are sufficiently effective. That is, the AI-learning engine II 1030 may analyze a number of fault events that have developed without the AI-analysis engine 1044 being able to effectively predict the development of the fault situation and mitigate this development before a fault situation evolves.

In one embodiment, the AI-learning engine II 1030 may amend the monitoring rules 1026, and/or produce new monitoring rules, to have more detailed patterns leading to fault situations and/or fault events so that the AI-learning engine I 1040 may generate more accurate and effective predictors.

In another embodiment, the AI-learning engine II 1030 may amend the simulation rules 1032 used by the training simulation system, and/or produce new simulation rules, to create better simulated log data to simulate more detailed patterns leading to fault situations and/or fault events so that the AI-learning engine I 1040 may generate more accurate and effective predictors. Additionally, the AI-learning engine II 1030 may rely on AI-learning engine II system 1010 for receiving the log data 1028, the network configuration 1046, and for communicating data to the monitoring rules 1026 and the simulation rules 1032.

The simulation system 1012 may receive the simulation rules 1032, and may also receive the log data 1028 and the network configuration 1046. As explained herein, the simulation software 1034 may cause the simulation system 1012 to output the simulated testing data 1038 and the simulated training data 1036.

In one embodiment, as shown, the simulated testing data 1038 may be provided to AI-analysis engine system 1016, and the simulated training data 1036 may be provided to AI-learning engine I 1014. Alternatively, however, the simulated testing data 1038 and the simulated training data 1036 may be both provided to either or both of the AI-analysis engine system 1016 and the AI-learning engine I system 1014.

The AI-learning engine system 1014 may also receive the log data 1028, and may output the analysis rules 1042. The analysis rules 1042 may be inputted to the AI-analysis engine system 1016. Alternatively, in other embodiments, the analysis rules 1042 may receive input as well from the AI-analysis engine system 1016. Additionally, the AI-analysis engine system 1016 may receive the log data 1028, and may amend or select the monitoring rules 1026 and, indirectly, the network configuration 1046. The network configuration 1046 may, in turn, be provided to the orchestration system 1018, which may amend or select the monitoring rules 1026, and may further be in communication with the communication network 1002, and thereby with customer's computing device 1006A, 1006B, 1006C, and/or 1006D, and/or customer's service computing devices 1004A, 1004B, and/or 1004C. Additionally, the orchestration system 238 may be used to implement the new network configuration 1046 (and/or the configuration change, and/or reconfiguration, etc.). The monitoring system 1008 may receive input from the communication network 1002, and the monitoring rules 1026, thereby creating an output of the log data 1028. In this manner, the log data 1028 can be created, tested by multiple systems, used to generate additional simulated log data, and subsequently used to train an AI system (such as the AI-learning engine I 1040, and/or the AI-learning engine II 1030).

Figure 11:
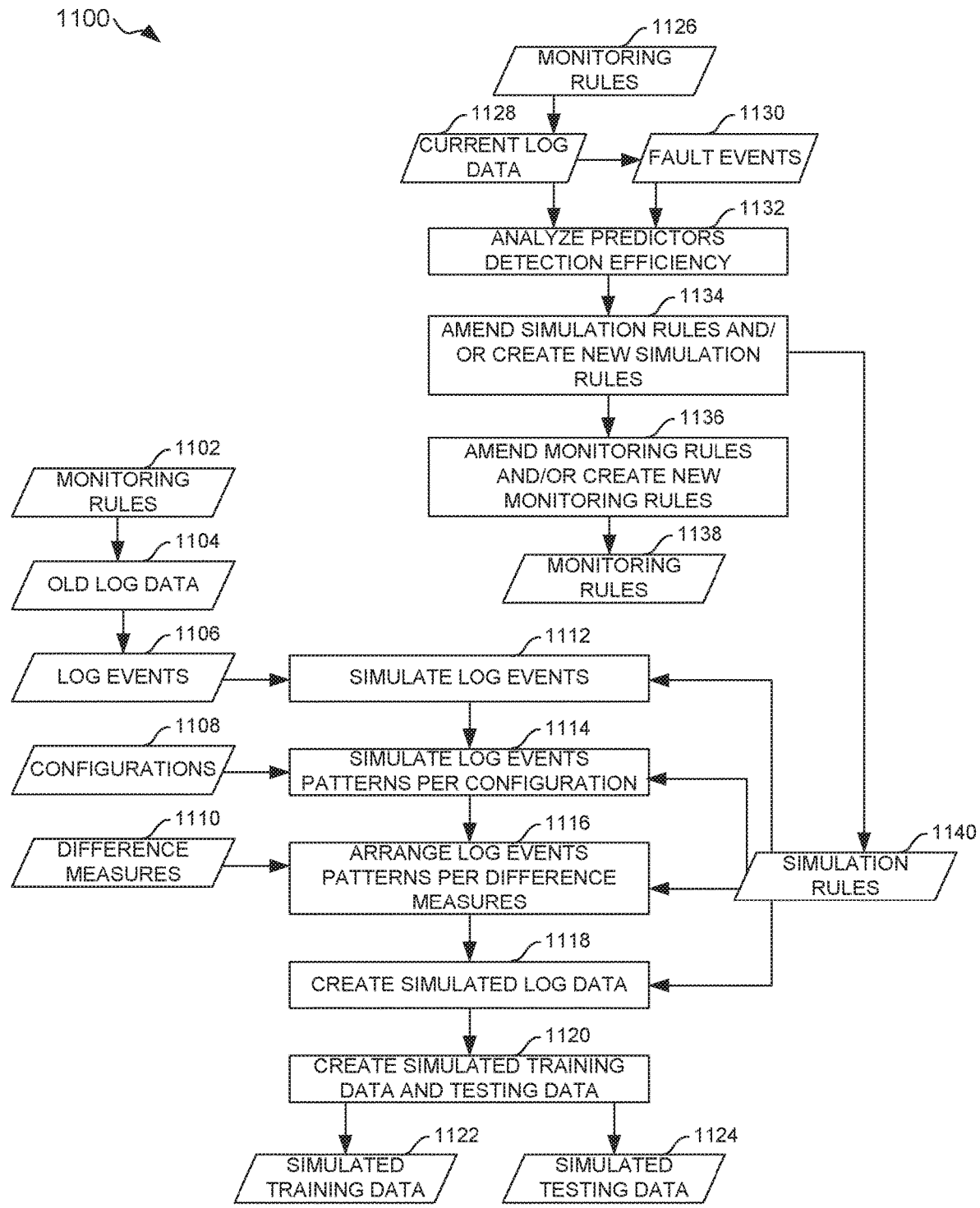
FIG. 11 illustrates a system flow diagram for automatically generating training data, in accordance with one embodiment.

FIG. 11 illustrates a system flow diagram 1100 for automatically generating simulated log data (as well as simulated training data and/or simulated testing data), in accordance with one embodiment. As an option, the system flow diagram 1100 may be implemented in the context of the details of the previous figures and/or any subsequent figure(s). Of course, however, the system flow diagram 1100 may be implemented in the context of any desired environment. Further, the aforementioned definitions may equally apply to the description below.

In operation, the system for automatically generating simulated log data (as well as simulated training data and/or simulated testing data) may use monitoring rules 1102 to generate old log data 1104 and generate a collection of log events 1106 that the system then passes to a training simulation system (see operation 1112) as baseline monitoring record(s) that the training simulation system can ultimately use to develop simulated log data. In one embodiment, the network management system may collect log data for various network configurations. The log data may be collected from network entities providing services to customers (and from other network entities, such as system network entities, operating systems, virtual machines, probes, etc.). The event log data reported by a service providing network entity may be pertinent to the particular service provided to a particular customer. When such service providing network entity is instantiated in any other location in the network it is expected to provide a similar service and thus report a similar event log data, which may be variated by the particular configuration, location, and neighboring network entities, as may be modified per the difference measure. Therefore, simulated log data may be created from various old log data modified according to difference measure.

Additionally, a record of old/prior network configurations 1108 may be kept and may also be passed to the training simulation system where the records may be used to develop simulated log data (see operation 1118). Further, difference measures 1110 may be sent to a training simulation system where log event patterns may be arranged (see operation 1116) to also contribute to eventually develop simulated log data (see operation 1118).

In a separate operation, a host of new monitoring rules 1138 may be developed. For example, the simulation rules 1140 may be amended by analyzing the of current log data 1128 with existing monitoring rules 1126, pairing current log data with fault events 1130 (if any), analyzing whether the current level of predictors are efficient at detecting system faults (see operation 1132), noting predictors that are accurate as well as predictors that are inaccurate, and using those metrics to either amend existing simulation rules or create new rules (see operation 1134). Further, in addition to passing the amended and/or new simulation rules 1140 to the training simulation system in the form of new criteria for training and testing, the amended and new simulation rules may be recorded for future iterative system analysis (see operation 1136) in the form of monitoring rules 1138. In one embodiment, the monitoring rules 1102 may include one or more of the monitoring rules derived from 1138.

In one embodiment, based on the log events 1106, the configurations 1108, the difference measurements 1110, and/or the simulation rules 1140, the training simulation system may create simulated log data (see operation 1118), and may create simulated training and testing data (see operation 1120). In one embodiment, this may occur by simulating log events (per operation 1112) from existing log event 1106, building simulations based on log patterns within a known configuration 1114, arranging log events patterns according to difference measures 1118, and finally creating simulated training data 1122 and testing data 1124 that the communication network managed by an AI-based network management and/or orchestration system may use to change the configuration and/or topology of the communication network according to the continuously evolving changes of loads and customer requirements.

In various embodiments, the system flow diagram 1100 may illustrate a process for generating simulated (synthesized) log-data including simulated (synthesized) training data and simulated (synthesized) testing data. For example, the network management system may use the monitoring rules 1102 to monitor a communication network and to generate (real) log-data (old log-data 1104) that includes a plurality of (real) log-events 1108. The log-data 1104 and the log-events 1108 may be construed as real in the sense that they have been collected during real activity of the communication network.

In operation 1112, the simulation rules 1140 and the log events 1108 may be used to generate simulated (synthesized) log-events. In operation 1114, the simulation rules 1140 and the simulated log events 1108 may be used to simulate (synthesize) log-event patterns pertinent to a particular network configuration (the configuration 1108). In operation 1116, difference measures may be used to arrange the log-event patterns.

In the context of the present description, a difference measure may represent a difference between any two (or more) configurations. For example, the difference measure may indicate a difference in the network topology, as may be represented by the relative location of particular network entities. The arrangement of the log-event patterns may therefore represent a value of the difference measure between the respective network configurations.

In operation 1118, the difference measures 1110 from the current network situation, the collection of log-data patterns, and the simulation rules 1140 may be used to create simulated log-data for a particular current network configuration. Additionally, in operation 1120, the simulated log-data may be used to generate the simulated training data 1122 and the simulated testing data 1124 for the particular current network configuration.

Further with respect to the operations 1112, 1114, 1116, and 1118 of FIG. 11, as explained above, in real operation of the communication network, when the communication network operates in the first configuration, network entities may produce event log data record and communicate these records to the monitoring system, which may create the (real) log-data. These network entities may be various types of software entities operating in respective hardware entities according to the first network configuration. In this sense, the network entities of the first configuration may produce first (real) event log data.

In a first operation (e.g., operation 1112 of FIG. 11) the simulation process may take the event log parameters reported by a first network entity of the first configuration (first event log data) and apply these reported parameters to a respective second network entity as determined according to the second configuration, thus creating second event log data.

It may be assumed that each first network entity of the first configuration may translate into a corresponding second network entity of the second configuration. It is to be appreciated that a first network entity may be split into two or more corresponding parallel second network entities, and/or that some first parallel network entities may be joined into two a single corresponding second network entity. In the context of the present description, the term "parallel" means that the parallel network entities provide the same service and/or functionality, and operate in parallel, to distribute load (or for a similar reason). In this sense, event log reports may be split or joined accordingly.

This process may be executed for all the (second) application software network entities of the second configuration until each (second application software) network entities of the second configuration has a sequence of event log parameters to be reported.

Next, the process may allocate software network entities to hardware network entities according to the second configuration to produce event log data reports for the respective hardware network entities representing the combination of the various (second application software) network entities operating in the respective (second) hardware network entity. At this point, all the network entities of the second configuration may have their respective sequences of event log parameters to be reported.

Additionally, the process modulates the event log data values and timing accounting to respective differences between the second configuration and first configuration as represented by the respective difference measures. This modulation may be particularly pertinent to a situation where there are several first configurations. For example, several first configurations may include when first event log data is received from a plurality of different configurations, and therefore there are second event log data that are sourced from different first configurations.

Moreover, the process may emulate the operation of the monitoring system to produce a synthesized log data combining all the patterns of event log-data computed and arranged as described above. Further, the training and testing data may be created including determining pertinent network situations and labeling the log data with labels of respective network situations.

In one embodiment, the simulation system may be used to create effective synthesized training log data and testing log data for the AI learning system, so that the AI learning system can create AI models that will detect classifiers in real run-time log data, in time to effect reconfiguration before the respective network situation matures.

The simulation process may include synthesizing event-log data timely ordered in virtual time. In the context of the present description, the phrase "timely ordered in virtual time" may refer to positioning the synthesized event-log data along a virtual time line of the synthesized training log-data and/or synthesized testing log-data. The time line may be construed as being virtual because it is synthesized (i.e., not real).

The simulation process may copy the synthesized event log data from real log data, with possible amendment reflecting changes due to differences in the network configuration. Therefore, the simulation rules may instruct the simulation process which event log data to copy, how to amend it and adapt it to the current configuration (regarding the difference between the original, real, configuration originating the particular event-log data, and the current configuration (e.g., difference measure)), and how to properly time the virtual occurrence of the particular event log data record.

In one embodiment, the simulation process may be used to produce synthesized training log data and/or synthesized testing log data that have appropriate (virtual/synthesized) network situations, and appropriate (virtual/synthesized) respective classifiers preceding their network situations. A good simulation creates synthesized (training and/or testing) log data that may enable the AI learning system to create AI-models that effectively detect classifiers and their network situations.

The quality of the simulation can therefore be evaluated first when AI models are created, and thereafter when the AI models are used with real run-time log data and effectively detect, or fail to detect, network situations, ahead of its realization. The simulation process may be used therefore to improve the simulation rules according to the actual results, so that newly produced synthesized (training and/or testing) log data may produce effective AI models.

It is to be appreciated that the simulation evaluation process may not evaluate the similarity of the synthesized data to the original data, or the ability of a detection or recognition system to differentiate between the synthesized data to the original data. Instead, the simulation evaluation process may evaluate a confidence level of the AI modules produced based on the synthesized data.

Figure 12:
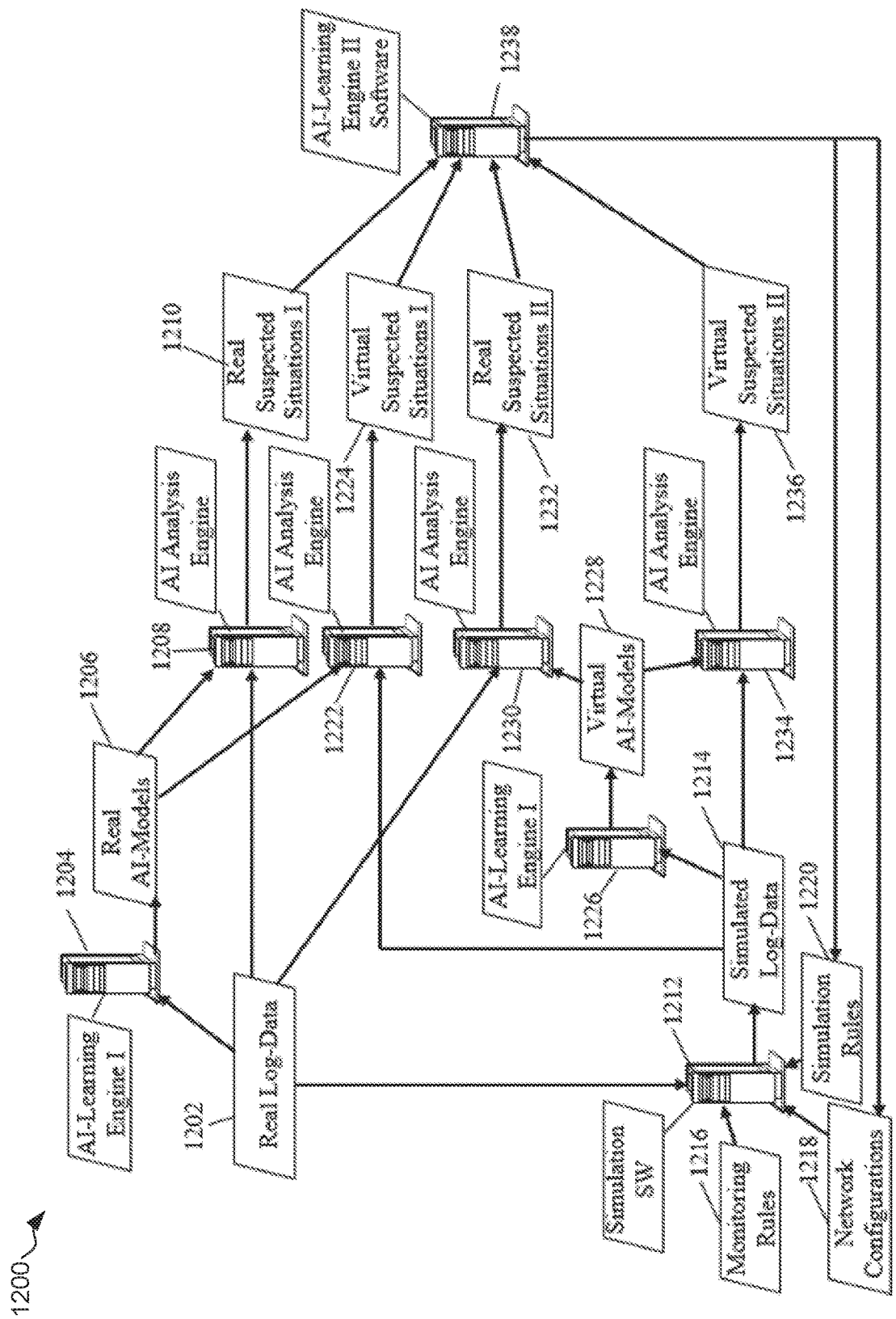
FIG. 12 illustrates arrangements of simulation evaluation, in accordance with one embodiment.

FIG. 12 illustrates arrangements 1200 of simulation evaluation, in accordance with one embodiment. As an option, the arrangements 1200 may be implemented in the context of the details of the previous figures and/or any subsequent figure(s). Of course, however, the arrangements 1200 may be implemented in the context of any desired environment. Further, the aforementioned definitions may equally apply to the description below.

In one embodiment, the four arrangements of FIG. 12 may be considered as steps in a process of producing simulation rules.

For simplicity, none of the arrangements of FIG. 12 show a training and testing preparation system with a labeling system, training data, testing data, a confidence analysis system, and/or a testing system. It is assumed that functions of these system are available, and that the log data shown in FIG. 12 is properly labeled as training data and/or testing data.

The first arrangement may include real log data 1202 collected and provided by the monitoring system in real operation of the communication network in a particular network configuration. The first arrangement may also include an AI-learning Engine I 1204 that analyzes real log data 1202 and produces real AI models 1206. The first arrangement may also include a real-time AI analysis system 1208 that uses the real AI models 1206 to analyze the real log-data 1202 and produce real suspected (or predicted) situations I 1210.

The second arrangement may include real log data 1202 collected and provided by the monitoring system in real operation of the communication network. The second arrangement may also include a simulation system 1212 that generates simulated (synthesized) log data 1214 based on the real log data 1202, monitoring rules 1216, network configuration(s) 1218 data, and simulation rules 1220. The second arrangement may also include an RT AI analysis engine 1222 that may use real AI-models 1206 to analyze simulated (synthesized) log data 1214 and produce virtual suspected (or predicted) situations I 1224.

The third arrangement may include the real log data 1202 collected and provided by the monitoring system in real operation of the communication network. The third arrangement may also include a simulation system 1212 that generates simulated (synthesized) log data 1214 based on the real log data 1202, monitoring rules 1216, network configuration(s) 1218 data, and simulation rules 1220. The third arrangement may also include an AI learning engine I 1226 that analyzes the simulated (synthesized) log data 1214 and produces virtual AI-models 1228. The third arrangement may also include a RT AI analysis engine 1230 that uses the virtual AI-models 1228 to analyze the real log data 1202 and produce real suspected (or predicted) situations II 1232.

The fourth arrangement may include the real log data 1202 collected and provided by the monitoring system in real operation of the communication network. The fourth arrangement may also include a simulation system 1212 that generates simulated (synthesized) log data 1214 based on the real log data 1202, monitoring rules 1216, network configuration(s) 1218 data, and simulation rules 1220. The fourth arrangement may also include an AI learning system 1226 that analyzes the simulated (synthesized) log data 1214 and produces virtual AI-models 1228. The fourth arrangement may also include a RT AI analysis engine 1234 that uses the virtual AI-models 1228 to analyze the simulated (synthesized) log data 1214 and produce virtual suspected (or predicted) situations II 1236.

In one embodiment, the simulation evaluation system may first use the first and second arrangements to compare a confidence level of the respective suspected situations produced, to evaluate a quality of the simulated (synthesized) log data 1214 in terms of the ability of the real AI-models 1206 to detect network situations. Additionally, the simulation system 1212 may be used to generate synthesized log-data 1214 having classifiers that are compatible with the real AI-models 1206.

As shown in FIG. 12, an AI learning engine II 1238 compares virtual suspected situations I 1224 with real suspected situations I 1210 and modifies monitoring rules 1220 until the comparison reaches a predetermined value. The comparison may include, for example, the number of reported suspected situations, and/or a weighted combination of the confidence levels of the reported suspected situations.

The simulation evaluation system may then use the first and third arrangements to compare the confidence level of the respective suspected situations produced, to evaluate the quality of the virtual AI models 1228 in terms of the ability of the virtual AI models 1228 to detect network situations in the real log data 1202. The AI learning engine II 1238 may then compare the real suspected situations II 1232 with real suspected situations I 1210 and modify monitoring rules 1220 until the comparison reaches a predetermined value. In one embodiment, the real suspected situations II 1232 and the real suspected situations I 1210 may be 'real' in the sense that suspected situation may be detected in real log-data, however using 'virtual' AI models in the sense that the AI-models are created based on virtual log-data. The comparison may include, for example, the number of reported suspected situations, and/or a weighted combination of the confidence levels of the reported suspected situations.

Using any of the first and second arrangements, or both, the AI learning engine II 1238 may repeat the above process for various network configurations for which there is sufficient real log data 1202. In this step, the AI learning engine II 1238 may consider the difference measures between the network configurations used.

The simulation evaluation system may then use the AI learning system II 1238 to variate the network configuration to divert from the network configurations used, namely network configurations for which there is sufficient real log data 1202. In this step, the simulation evaluation system may use the simulation system 1212 to generate simulated (synthesized) log data 1214 using simulation rules 1220 of network configurations 1218 having a smallest difference measure from the current (variated) configuration. The AI learning engine II 1238 may then compare the confidence level of the virtual suspected situations II 1236 it produces with the outputs of the second and third arrangements. In one embodiment, for a predetermined difference measure, the quality of the prediction may be comparable with the quality provided by the second and third arrangements (and preferably better).

Figure 13:
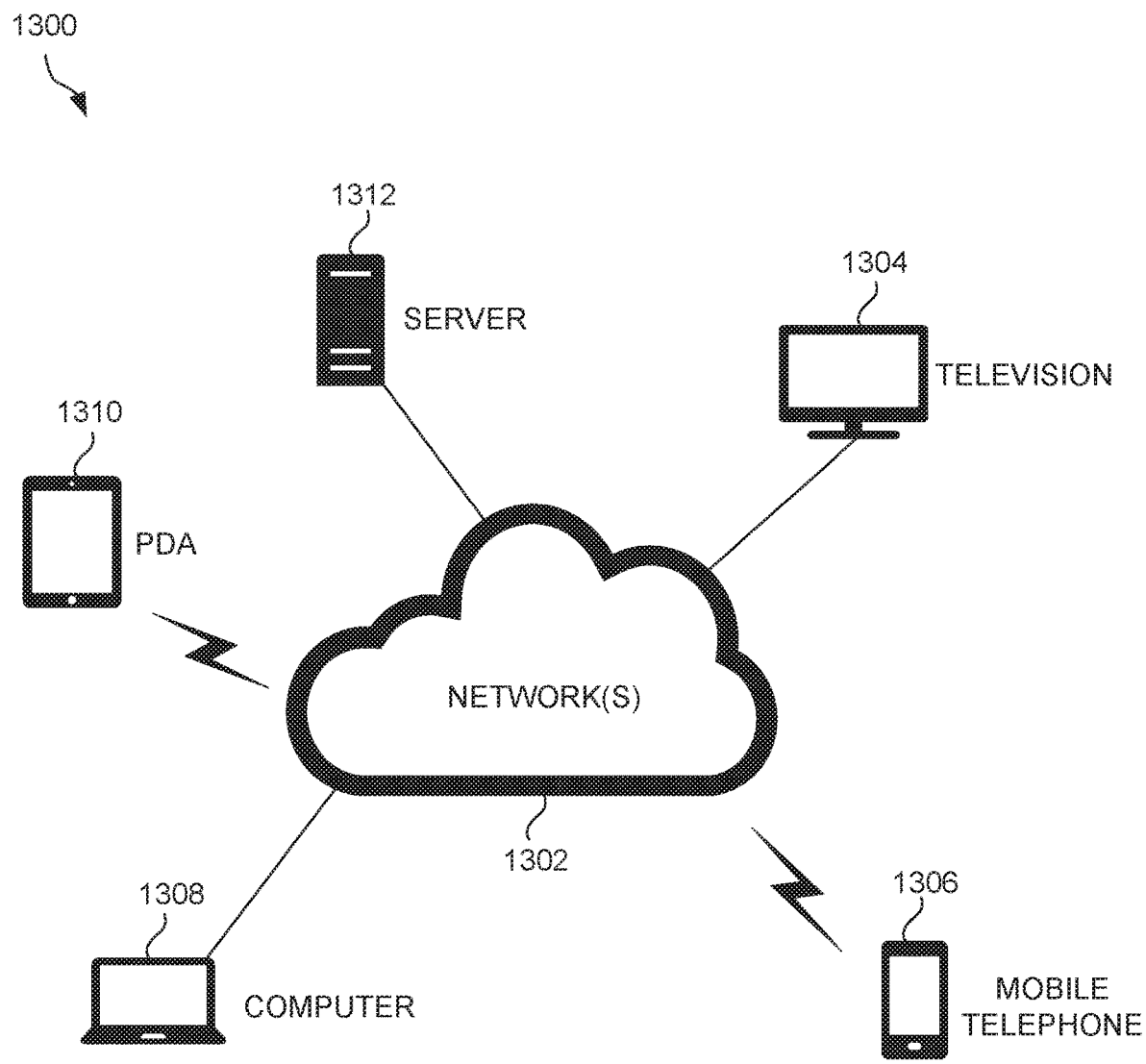
FIG. 13 illustrates a network architecture, in accordance with one possible embodiment.

FIG. 13 illustrates a network architecture 1300, in accordance with one possible embodiment. As shown, at least one network 1302 is provided. In the context of the present network architecture 1300, the network 1302 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1302 may be provided.

Coupled to the network 1302 is a plurality of devices. For example, a server computer 1312 and an end user computer 1308 may be coupled to the network 1302 for communication purposes. Such end user computer 1308 may include a desktop computer, lap-top computer, and/or any other type of logic. Still yet, various other devices may be coupled to the network 1302 including a personal digital assistant (PDA) device 1310, a mobile phone device 1306, a television 1304, etc.

Figure 14:
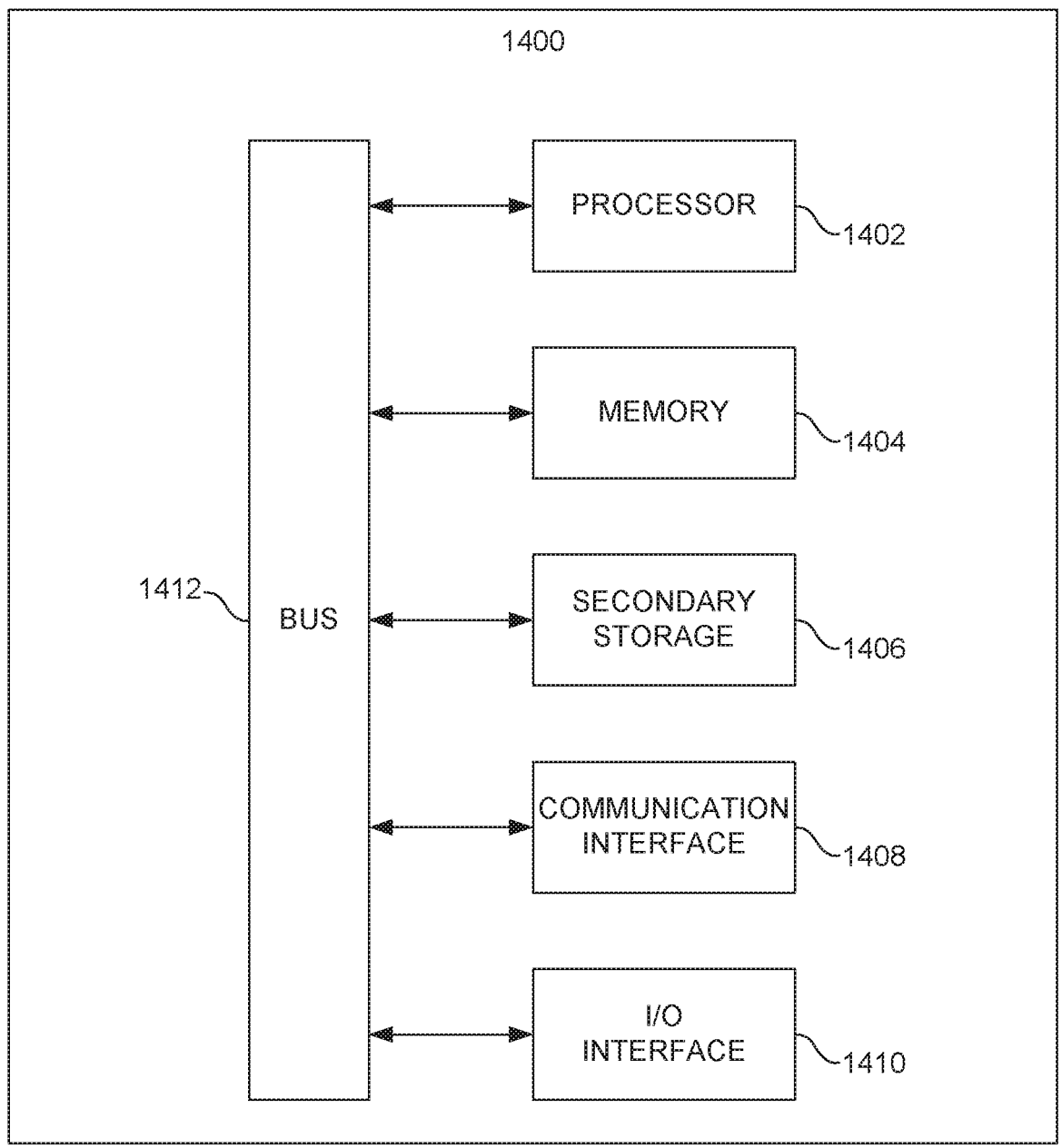
FIG. 14 illustrates an exemplary system, in accordance with one embodiment.

FIG. 14 illustrates an exemplary system 1400, in accordance with one embodiment. As an option, the system 1400 may be implemented in the context of any of the devices of the network architecture 1300 of FIG. 13. Of course, the system 1400 may be implemented in any desired environment.

As shown, a system 1400 is provided including at least one central processor 1402 which is connected to a communication bus 1412. The system 1400 also includes main memory 1404 [e.g. random access memory (RAM), etc.]. The system 1400 also includes a graphics processor 1408 and a display 1410.

The system 1400 may also include a secondary storage 1406. The secondary storage 1406 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 1404, the secondary storage 1406, and/or any other memory, for that matter. Such computer programs, when executed, enable the system 1400 to perform various functions (as set forth above, for example). Memory 1404, storage 1406 and/or any other storage are possible examples of non-transitory computer-readable media. It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A computer program product comprising computer executable instructions stored on a non-transitory computer readable medium that when executed by a processor instruct the processor to:

receive, for a first configuration of a communication network, log data indicating events detected within the communication network having the first configuration and first network configuration data indicating the first configuration of the communication network, the first configuration being a first arrangement of at least one of hardware and software in the communication network;

receive, for a second configuration of the communication network, second network configuration data indicating the second configuration of the communication network, the second configuration different from the first configuration and being a second arrangement of at least one of hardware and software in the communication network;

produce simulated log data for the second configuration of the communication network, based on the log data received for the first configuration of the communication network and the second network configuration data, the simulated log data indicating events simulated within the communication network having the second configuration; and create one or more artificial intelligence models, using the simulated log data, the one or more artificial intelligence models trained to detect classifiers of network situations in run-time log data prior to the network situations occurring.

2. The computer program product of claim 1, wherein produce simulated log data includes using simulation rules based on the log data.

3. The computer program product of claim 1, wherein the computer program product is configured to use the simulated log data to train an AI-learning engine.

4. The computer program product of claim 3, wherein the computer program product is configured to produce simulated testing data for the second network configuration data of the second configuration of the communication network based on the log data.

5. The computer program product of claim 4, wherein the AI-learning engine creates analysis rules to analyze the log data.

6. The computer program product of claim 5, wherein the computer program product is configured to use the simulated testing data to test the analysis rules.

7. The computer program product of claim 5, wherein the computer program product is configured to produce a third configuration of the communication network by using the analysis rules to analyze a third log data produced by the second configuration of communication network.

8. The computer program product of claim 1, wherein the simulated log data is used to supplement the log data, the supplemented log data being used to train an AI-learning engine.

9. The computer program product of claim 1, wherein the network situations require a new configuration of the communication network.

10. The computer program product of claim 1, wherein an AI-learning engine applies a difference measure to evaluate the first configuration against the second configuration.

11. A method, comprising:
receiving, for a first configuration of a communication network, log data indicating events detected within the communication network having the first configuration and first network configuration data indicating the first configuration of the communication network, the first configuration being a first arrangement of at least one of hardware and software in the communication network;

receiving, for a second configuration of the communication network, second network configuration data indicating the second configuration of the communication network, the second configuration different from the first configuration and being a second arrangement of at least one of hardware and software in the communication network;

producing simulated log data for the second configuration of the communication network, based on the log data received for the first configuration of the communication network and the second network configuration data, the simulated log data indicating events simulated within the communication network having the second configuration; and creating one or more artificial intelligence models, using the simulated log data, the one or more artificial intelligence models trained to detect classifiers of network situations in run-time log data prior to the network situations occurring.

12. A device, comprising:
a non-transitory memory storing instructions; and
one or more processors in communication with the non-transitory memory, wherein the one or more processors execute the instructions to:

receive, for a first configuration of a communication network, log data indicating events detected within the communication network having the first configuration and first network configuration data indicating the first configuration of the communication network, the first configuration being a first arrangement of at least one of hardware and software in the communication network;

receive, for a second configuration of the communication network, second network configuration data indicating the second configuration of the communication network, the second configuration different from the first configuration and being a second arrangement of at least one of hardware and software in the communication network;

produce simulated log data for the second configuration of the communication network, based on the log data received for the first configuration of the communication network and the second network configuration data, the simulated log data indicating events simulated within the communication network having the second configuration; and create one or more artificial intelligence models, using the simulated log data, the one or more artificial intelligence models trained to detect classifiers of network situations in run-time log data prior to the network situations occurring.

13. The computer program product of claim 1, wherein the simulated log data is produced for the second configuration of the communication network when the second configuration of the communication network is new and has not yet been deployed to the communication network such that no history of log data for the second configuration exists.

14. The computer program product of claim 13, wherein the simulated log data is utilized to generate new analysis rules adapted to the new second configuration of the communication network.

* * * * *